US012545171B2

(12) United States Patent
Emmerich

(10) Patent No.: US 12,545,171 B2
(45) Date of Patent: Feb. 10, 2026

(54) TIE-DOWN WINCH, ACCESSORIES, AND METHODS OF USE

(71) Applicant: Scott J. Emmerich, Delavan, WI (US)

(72) Inventor: Scott J. Emmerich, Delavan, WI (US)

( * ) Notice: Subject to any disclaimer, the term of this patent is extended or adjusted under 35 U.S.C. 154(b) by 303 days.

(21) Appl. No.: 18/109,983

(22) Filed: Feb. 15, 2023

(65) Prior Publication Data

US 2023/0256893 A1    Aug. 17, 2023

Related U.S. Application Data

(60) Provisional application No. 63/357,987, filed on Jul. 1, 2022, provisional application No. 63/310,423, filed on Feb. 15, 2022.

(51) Int. Cl.
*B60P 7/00* (2006.01)
*B60P 7/08* (2006.01)

(52) U.S. Cl.
CPC ............ *B60P 7/083* (2013.01); *B60P 7/0846* (2013.01)

(58) Field of Classification Search
CPC ....... B60P 7/0823; B60P 7/083; B60P 7/0846; B60P 7/0853; B60P 7/0838
See application file for complete search history.

(56) References Cited

U.S. PATENT DOCUMENTS

| | | | | |
|---|---|---|---|---|
| 7,278,808 B1 * | 10/2007 | Sisk, Sr. | ............... | B60P 7/0853 279/144 |
| 8,308,410 B2 * | 11/2012 | Foryan | .................... | B60P 7/083 410/103 |
| 8,348,239 B2 | 1/2013 | Chou | | |
| 2007/0217884 A1 * | 9/2007 | McGrew | ............... | B60P 7/0853 410/100 |
| 2009/0074531 A1 * | 3/2009 | Schmidt | ................ | B60P 7/0853 410/103 |
| 2011/0150595 A1 * | 6/2011 | Foryan | .................... | B60P 7/083 254/223 |
| 2015/0274061 A1 * | 10/2015 | Wilkinson | .............. | F16D 1/112 403/287 |
| 2018/0179018 A1 * | 6/2018 | Henderson | .............. | B60P 7/083 |

OTHER PUBLICATIONS amazon.com, 2—Lashing Winch 2 Inches (1 Left, 1 Right) f Track Tie Down Tow Dolly Rack Strap Ratchet Binder Truck Flat, depicting a product believed to be publicly available before Feb. 15, 2023, 7 pp.
amazon.com, Porta Winch Truck Winch for Stake Pockets—Outward Offset, depicting a prodcuct believed to be publicly available before Feb. 15, 2023, 7 pp.

* cited by examiner

*Primary Examiner* — Steven O Douglas
(74) *Attorney, Agent, or Firm* — Fitch, Even, Tabin & Flannery LLP

(57) ABSTRACT

A tie-down winch is provided including a frame having a first arm and a second arm. The winch includes a shaft supported by the first arm and the second arm of the frame such that the shaft is able to rotate. The winch includes a drive socket at a first end of the shaft sized to receive a drive head of a tool to rotate the shaft.

16 Claims, 21 Drawing Sheets

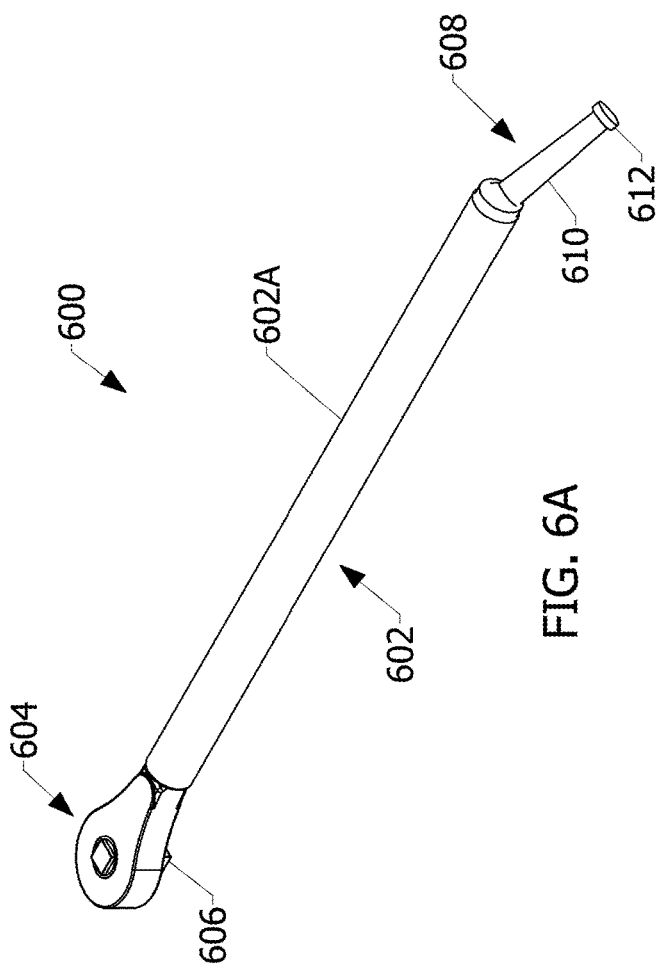
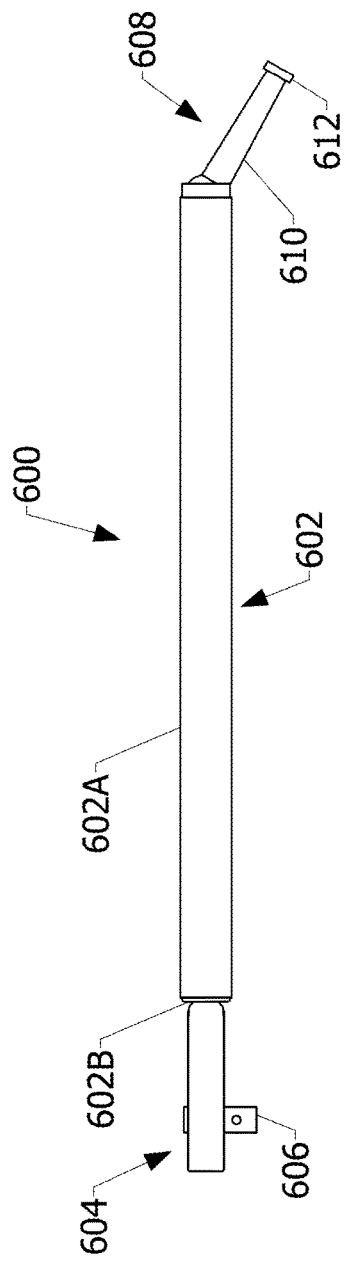
FIG. 6A
FIG. 6B

TIE-DOWN WINCH, ACCESSORIES, AND METHODS OF USE

CROSS-REFERENCE TO RELATED APPLICATIONS

This application claims the benefit of U.S. Provisional Application No. 63/357,987, filed Jul. 1, 2022, and U.S. Provisional Application No. 63/310,423, filed Feb. 15, 2022, which are incorporated herein by reference in their entirety.

FIELD

This disclosure relates to devices for securing items to a vehicle such as a flatbed trailer and, in particular, to tie-down winch systems.

BACKGROUND

Properly securing a load to the vehicle is important to prevent the load from shifting or falling off the vehicle during transit. Many flatbed trailers include rings, loops, anchors, and bars to which straps or chains may be attached to secure a load to the trailer. In one existing system shown in FIG. 5, a tie-down winch 10 may be attached to the side of the flatbed trailer. The tie-down winch 10 provides a system for receiving and tightening straps to secure a load to the flatbed trailer. The tie-down winch 10 includes a U-shaped frame 12 having a first arm 14 and a second arm 16. The tie-down winch 10 includes a shaft 18 that extends through holes of the first arm 14 and second arm 16 of the frame 12. The shaft 18 includes a longitudinal slot 20 extending along the shaft 18 for receiving a strap therethrough. A strap 18 may be fed through the slot 20 until the strap 18 is taut or there is little slack in the strap. The shaft 18 may be rotated within the frame 12 to wind the strap about the shaft to further pull and tighten the strap to secure the load. The shaft 18 includes a cylindrical head 22 at one end thereof with a plurality of holes 24 extending radially inward through the head 22. A pry bar or rod may be inserted into one or more of the holes 24 of the head 22 of the shaft 18 to turn the shaft 18 to tighten the strap. The other end of the shaft 18 is attached to a rachet member 25 and pawl 26 that allows the shaft 18 to rotate to tighten the strap while preventing the shaft 18 from unintentionally rotating in a reverse direction to loosen the strap. The pawl 26 may be disengaged from the ratchet member 25 to loosen the strap and unwind the strap from the shaft 18.

A shortcoming with the tie-down winch 10 of FIG. 5 is that tightening the strap with the pry bar or rod is time consuming and cumbersome. To tighten the strap, the pry bar or rod must be repeatedly inserted into and removed from the holes 24 of the head 22 of the shaft 18. Once inserted into the holes 24, the pry bar may be used to rotate the shaft 18 a partial turn (e.g., a quarter turn) before having to withdraw the pry bar and reinsert the pry bar into another of the holes 24 to rotate the shaft 18 further. The steps of repeatedly inserting and withdrawing the pry bar from the holes 24 does not allow the straps to be quickly tightened. Moreover, there often is not enough room to move the pry bar to turn the shaft 18 because the flatbed trailer is often parked close to another trailer or object.

BRIEF DESCRIPTION OF THE DRAWINGS

FIG. 6A is a perspective view of a winch tightening tool shown in a retracted configuration.

FIG. 6B is a side view of the winch tightening tool of FIG. 6A.

DETAILED DESCRIPTION

Figure 1:
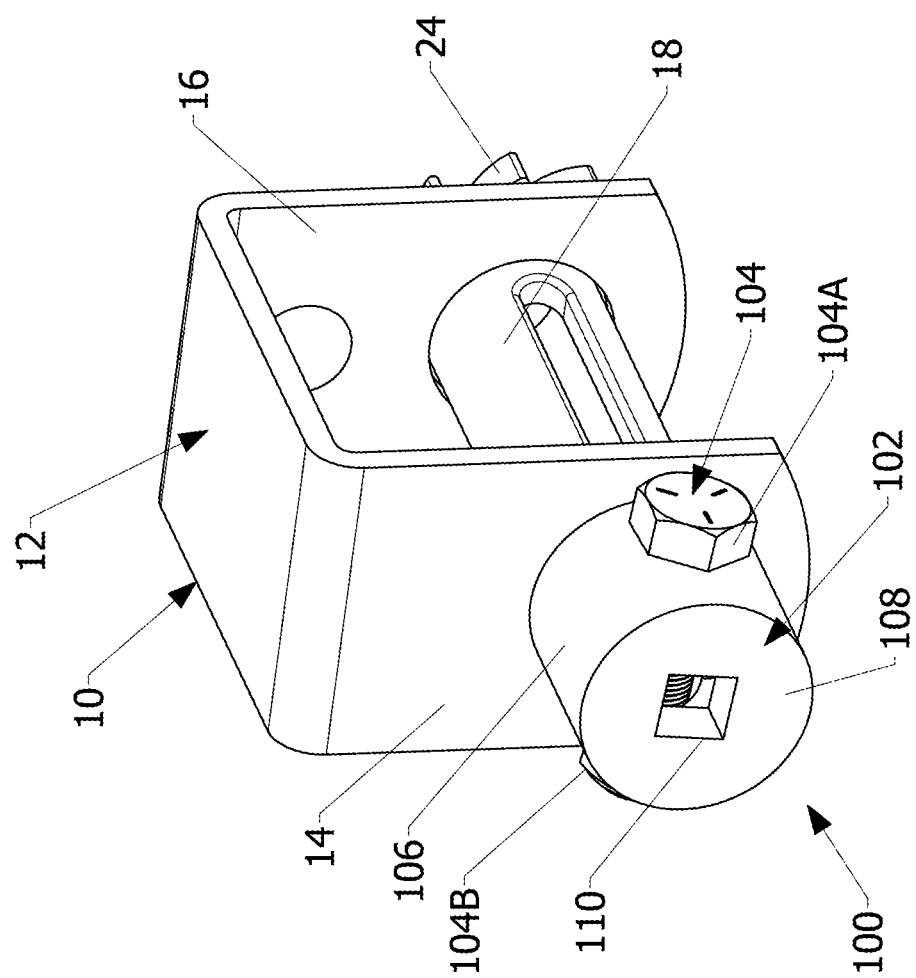
FIG. 1 is a top perspective view of a coupler having a drive socket secured to a tie-down winch of FIG. 5.
Figure 5:
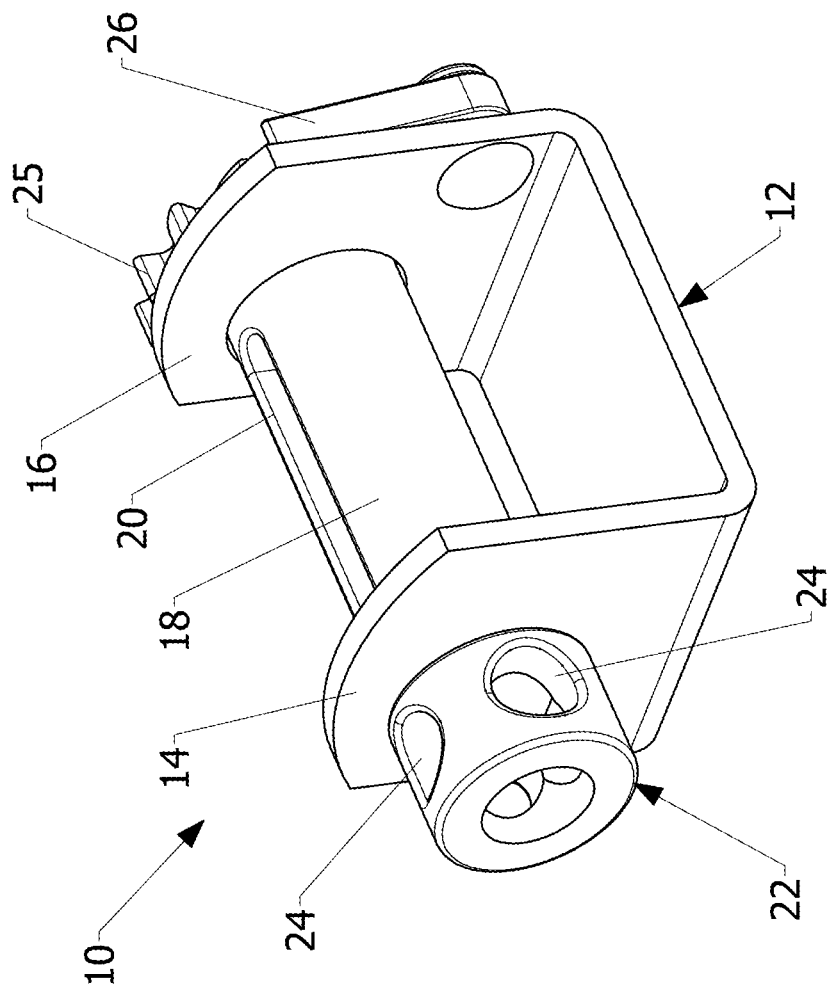
FIG. 5 is a top perspective view of a prior art tie-down winch.

With respect to FIG. 1, a coupler 100 is provided for mounting to the head 22 of the shaft 18 of the tie-down winch of FIG. 5. The coupler 100 includes a cylindrical body 102 and a fastener 104. The cylindrical body 102 includes a cylindrical sidewall 106 and an end plate 108. The cylindrical sidewall 106 defines an interior sized to receive the head 22 of the shaft 18 of the tie-down winch 10. The cylindrical sidewall 106 may thus be positioned over the head 22 of the shaft 18 with the head 22 within the interior of the cylindrical body 102. Where the head 22 of the shaft 18 of the tie-down winch 10 is cylindrical, the cylindrical sidewall 106 may define a cylindrical cavity sized to receive the head 22 therein.

The cylindrical sidewall 106 defines holes on either side of the cylindrical body 102 for receiving the fastener 104 therethrough. The holes of the cylindrical sidewall 106 may be aligned with the holes 24 of the head 22 of the shaft 18 of the winch 10. The fastener 104 may be extended through a first hole of the sidewall 106 of the coupler, through a first hole 24 of the head 22, through a second hole 24 of the head 22, and through a second hole of the sidewall 106 of the coupler 100. In the form shown, the fastener 104 is a bolt 104A and a nut 104B. The nut 104B may be threaded to the bolt 104A to secure the coupler 100 to the head 22 of the shaft 18. Once the coupler 100 is secured to the head 22 of the shaft 18, the coupler 100 is not able to rotate substantially relative to the head 22 of the shaft 18.

The end plate 108 includes a drive socket 110 sized for receiving a drive head of a tool such as conventional ratchet, impact driver, or the like. The drive socket 110 may be aligned with the axis of rotation of the shaft 18. As shown, the drive socket 110 is a substantially square hole in the end plate 108 of the cylindrical body 102 of the coupler 100. The drive head may be, for example, a ¼ inch, ⅜ inch, ½ inch, or ¾ inch ratchet drive. While the drive socket 110 is shown to be square shaped, the drive socket 110 may have other shapes that are capable of receiving a square drive head and/or drive heads of other shapes. For example, the drive socket 110 may be sized and shaped to receive one or more of types of drive heads including torx, hex, Phillips, flathead, and the like. In other forms, the drive socket 100 is a recess or cavity in the end plate 108 that does not extend through the end plate 108 that receives the drive head of the tool (e.g., a ratchet).

Once the coupler 100 is secured to the head 22 of the shaft 18 as described above, the drive head of a tool, such as a ratchet, may be inserted into the drive socket 100 of the coupler 100. The ratchet may then be used to turn the shaft 18, for example, to tighten a strap. Where a ratchet is used to turn the coupler 100, the ratchet may be inserted into the coupler 100 once to tighten the strap without having to remove the ratchet after each partial turn. This is advantageous over the existing systems where a pry bar needs to be removed and reinserted after completing each partial turn. Moreover, by using a conventional drive head on the coupler 100, conventional tools, such as ratchets, may be used to tighten the straps quickly. Additionally, a ratchet may be used without needing to first attach a socket of a certain size to the ratchet. This is advantageous as only a single component may be needed (e.g., the ratchet) rather than also requiring a separate socket which is prone to being lost over time.

Figure 2:
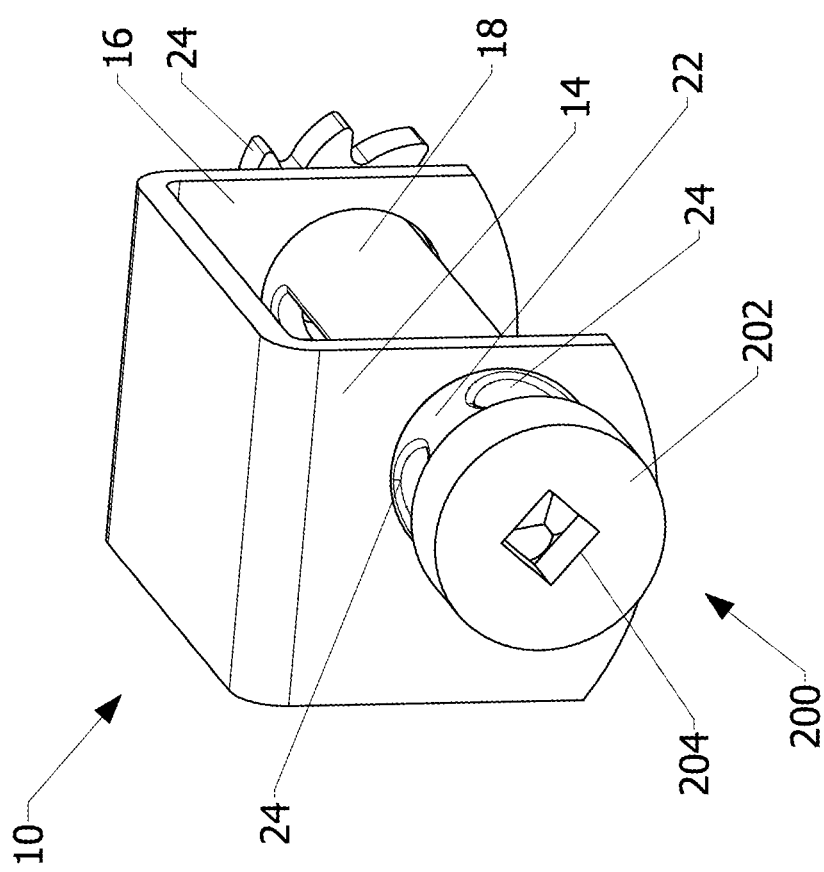
FIG. 2 is a top perspective view of tie-down winch coupler having a drive socket secured to the tie-down winch of FIG. 5.

With respect to FIG. 2, a coupler 200 is shown according to another embodiment. The coupler 200 is similar to the coupler 100 of FIG. 1 in that it is secured to the head 22 of the shaft 18 of the tie-down winch 10 of FIG. 5 and used to turn the shaft 18 to tighten straps. The coupler 200 includes a plate 202 having a drive socket 204. The plate 202 may be permanently secured to an end surface of the head 22 of the shaft 18 by welding the plate 202 to the head 22 to rigidly secure the coupler 200 to the head 22. The drive socket 204 is similar to the drive socket 110 of the coupler 100 of FIG. 1. The drive socket 204 may be aligned with the axis of rotation of the shaft 18. The drive socket 204 may be sized for receiving a drive head of a tool such as conventional ratchet, impact driver, or other types of conventional drive heads. In other forms, the drive socket 204 is a recess or cavity in the plate 202 (rather than a hole) that receives the drive head of the tool.

Once the coupler 200 is secured to the head 22 of the shaft 18 of the tie-down winch 10, a drive head of a tool (e.g., a ratchet) may be inserted into the drive socket 204 of the coupler 200. The tool may be used to rotate the coupler 200 to cause the shaft 18 to rotate and tighten a strap of the winch 10 without having to repeatedly remove and reinsert the tool. One advantage of the coupler 200 is that the holes 24 of the head 22 are still accessible after the coupler 200 is attached to the head 22. This enables a user to tighten the strap of the winch 10 using either the coupler 200 as described above or using the conventional approach with a pry bar and the holes 24. Thus, even if the user does not have a ratchet or tool with a drive head the fits in the drive socket 204 of the coupler 200, the user may still be able to tighten the strap of the winch 10 using a pry bar or rod.

Figure 3:
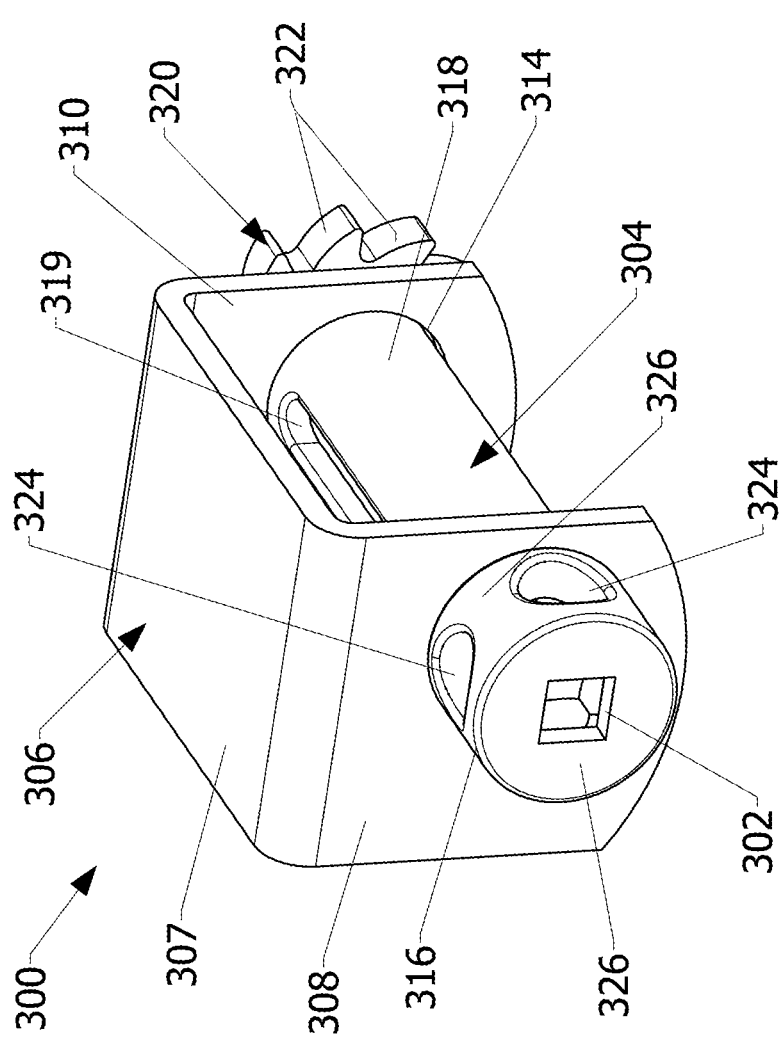
FIG. 3 is a top perspective view of a tie-down winch having a drive socket.

With respect to FIG. 3, a tie-down winch 300 is shown including a drive socket 302 formed integrally with the shaft 304. The tie-down winch 300 includes a U-shaped frame 306 having a base 307, a first arm 308 extending from one end of the base 307, and a second arm 310 extending from the other end of the base 307. The base 307 of the frame 307 may be secured to a trailer or flatbed by welding or via fasteners and/or a bracket. The first arm 308 defines a hole (not shown) and the second arm defines a hole 314 for receiving and supporting the shaft 304.

The shaft 304 includes a head 316 and a winding portion 318. The diameter of the head 316 may be larger than the diameter of the winding portion 318. The winding portion 318 may extend from the head 316 and through the holes of the first and second arms 308, 310. The first and second arms 308, 310 thus support the shaft 304 and permit the shaft 304 to rotate therein. The winding portion 318 of the shaft 318 includes a longitudinal slot 319 extending along the length thereof through which a strap may be extended. For example, a strap may be pulled through the slots to use the winch 300. The strap may be drawn through the slots until the strap is substantially taut. The shaft 304 may then be rotated to wind the strap about the shaft 304 and to further tighten the strap.

A ratchet member 320 may be attached to the end of the shaft 304 opposite the head 316. The ratchet member 320 includes teeth 322 that may cooperate with a pawl (not shown) that may permit the shaft 304 to rotate in one direction and prevent the shaft from rotating in the opposite direction. The ratchet 302 and pawl may thus permit a strap to be wound about the shaft 304 to tighten the strap and prevent the strap from unwinding from the shaft 304 or becoming loose. The pawl may be moved to disengage the pawl from the teeth 322 of the ratchet 320 when a user desires to unwind the strap from the shaft 304 to loosen the strap or otherwise rotate the shaft 304 in the reverse direction.

The head 316 of the shaft 304 is substantially cylindrical having a cylindrical outer wall 326. The head 316 includes holes 324 extending radially inward through the cylindrical outer wall 326. The end wall 326 of the head 316 defines the drive socket 302. The drive socket 302 may be aligned with the axis of rotation of the shaft 304. The drive socket 302 is thus formed as a single piece or unitarily with the head 316 of the shaft 304. The drive socket 302 is sized and shaped to receive a drive head of a tool (e.g., a ratchet, impact driver, etc.) similar to the drive sockets of the couplers described above. For example, a drive head of a ratchet may be inserted into the drive socket 302 and the ratchet used to rotate the shaft 304 to wind the strap about the shaft 304 to tighten the strap 304. While the drive socket 302 is shown a square, as described above, the drive socket 302 may be sized and shaped to receive a square drive head and/or drive heads of other shapes such as torx, hex, Phillips, slotted, and the like.

The tie-down winch 300 is advantageous because the tie-down winch does not need to be retrofit with a coupler but instead includes a drive socket 302 formed integrally with the tie-down winch 300. The tie-down winch 300 may be secured to a flatbed (e.g., via welding or fasteners) and enables a user to tighten a strap extending through the winch 10 via a tool with a drive head (e.g., a ratchet). The tie-down winch 300 further also includes the radially extending holes 324 enabling a user to also use a pry bar to tighten the straps of the tie-down winch 300 when desired.

With respect to FIGS. 4A-4E, an accessory tool 400 is provided for use with the tie-down winch 10 of FIG. 5. The accessory tool 400 may be attached to a ratchet like a typical socket and positioned over the head 22 of the shaft 18 of the winch 10 to turn the shaft 18 to tighten the strap of the winch 10.

Figure 4A:
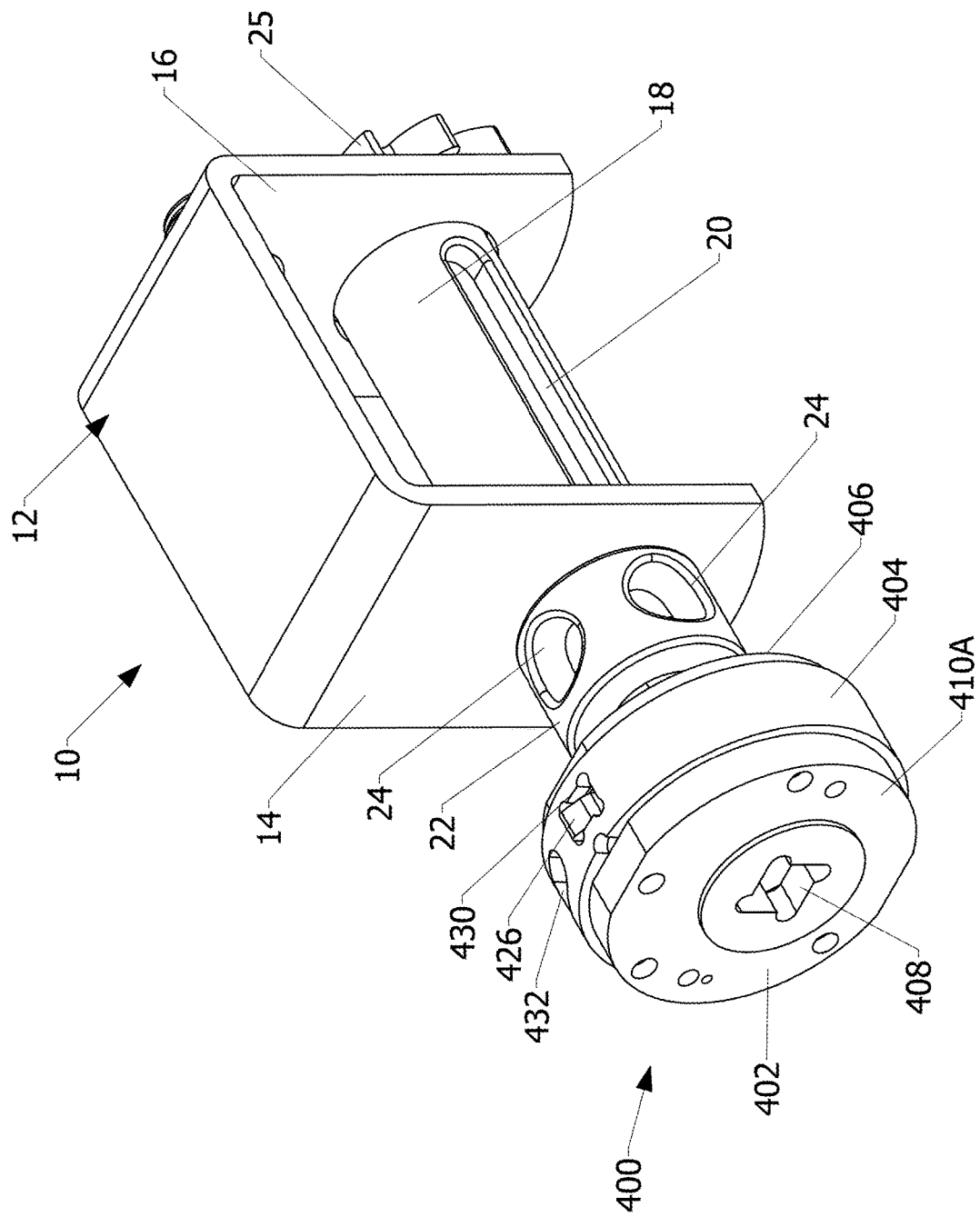
FIG. 4A is a top perspective view of a ratchet attachment for use with the tie-down winch of FIG. 5.
Figure 4B:
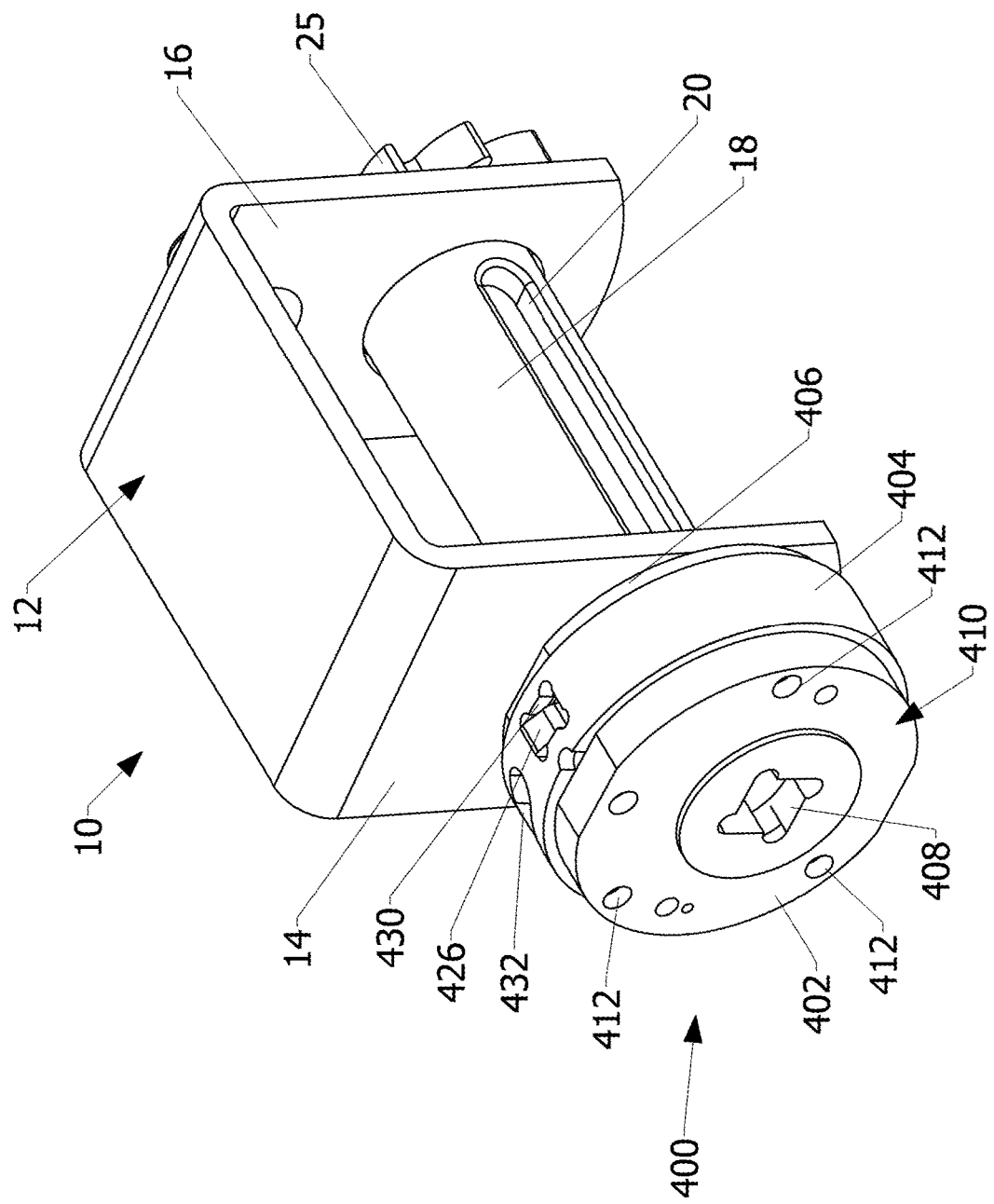
FIG. 4B is a top perspective view of the ratchet attachment of FIG. 4A mounted to the tie-down winch of FIG. 5.
Figure 4C:
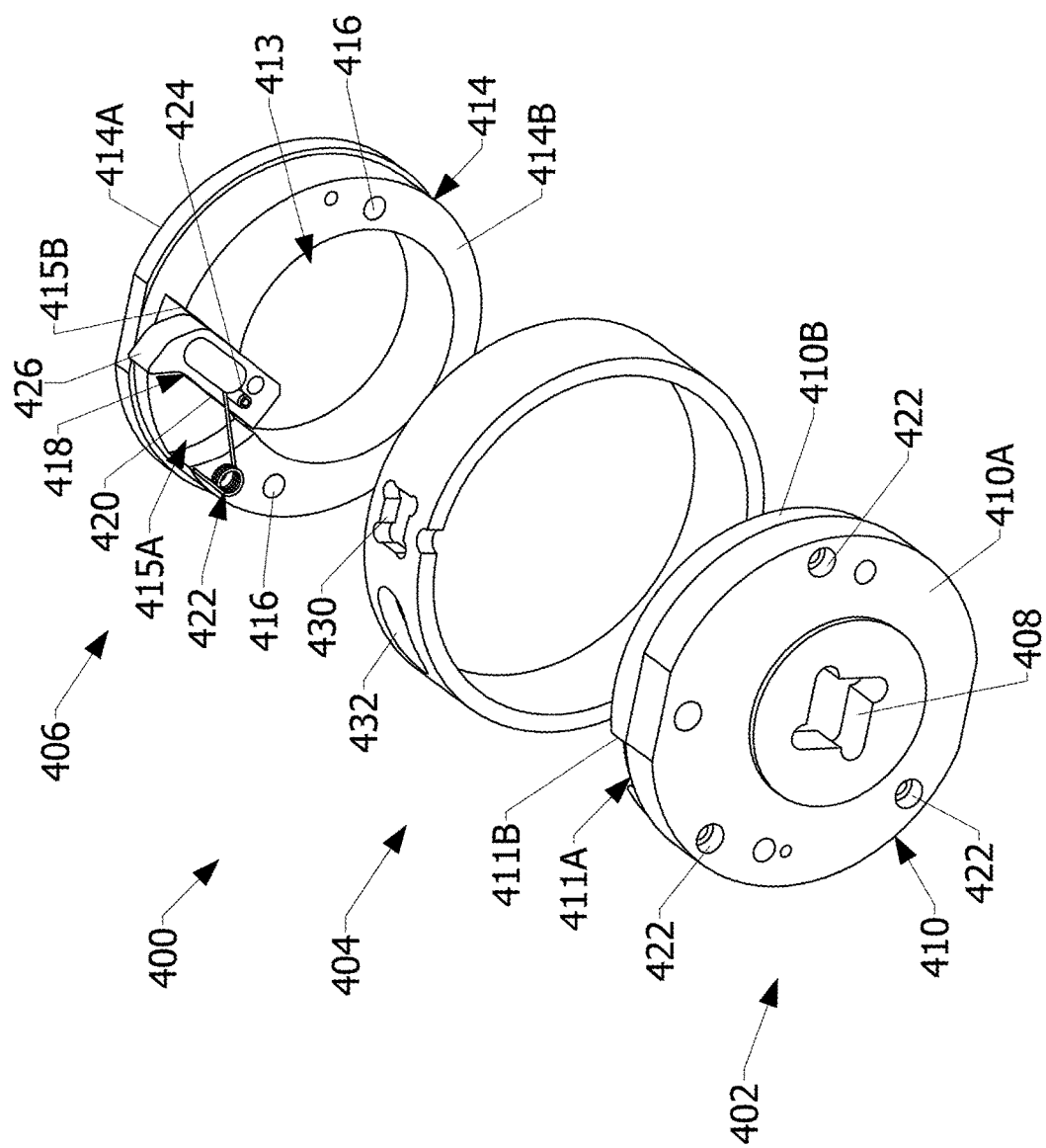
FIG. 4C is an exploded view of the ratchet attachment of FIG. 4A.

With respect to FIG. 4C, the accessory tool 400 includes a body comprising a rear hub 402, a sleeve 404, and a front hub 406. The rear hub 402 defines a drive socket 408 for receiving a drive head of a ratchet. While a ratchet is primarily described in the following discussion, it should be understood that other tools including a drive head, such as an impact driver, may similarly be used with the accessory tool 400. The drive socket 408 may be sized and shaped to receive a square drive head of a ratchet such as a ¼ inch, ⅜ inch, ½ inch, or ¾ inch ratchet drive. In the form shown, the drive socket 408 has a square shape with notches extending outward from the square. Including notches may aid in forming the drive socket 408 in the back plate 402. In some forms, the drive socket 408 is substantially square or has another shape sized and shaped to receive a drive head of a ratchet therein. The accessory tool 400 may be reversibly attached to the drive head of the ratchet similar to a conventional socket. An inner surface of the drive socket 408 may include a detent for receiving a ball of the drive head of the ratchet to aid in securing the accessory tool 400 to the ratchet and to prevent the accessory tool 400 from unintentionally becoming disconnected from the drive head.

The rear hub 402 may have a substantially cylindrical body 410 including a back plate portion 410A and an insertion portion 410B of a reduced diameter relative to the back plate 410A that may be inserted into an end of the sleeve 404. The insertion portion 410B may include a recessed portion 411A and a stop wall 411B for the pawl 418 as described in further detail below. The cylindrical body 410 defines attachment holes 412 for attaching the rear hub 402 to the front hub 406.

The front hub 406 may have a substantially cylindrical body 414 having a front plate portion 414A and an insertion portion 414B of a reduced diameter relative to the front plate portion 414A that may be inserted into an end of the sleeve 404 opposite the back plate 402. The cylindrical body 414 of the front hub 406 further defines attachment holes 416 for attaching the front hub 406 to the back plate 402. Fasteners may be extended through the attachment holes 412 of the rear hub 402 to the attachment holes 416 of the front hub 406 to secure the front hub 406 to the rear hub 402 with the sleeve 404 held between the rear hub 402 and the front hub 406. The body 414 defines a central opening 413 that is sized to receive the head 22 of the shaft 18 of the tie-down winch 10 of FIG. 5 into an internal cavity of the accessory tool 400.

A pawl 418 is pivotably mounted to the body 414 of the front hub 406 and/or the body 410 of the rear hub 402. The body 414 of the front hub 406 may define a recessed portion 415A in the insertion portion 414B in which the pawl 418 is positioned. When the rear hub 402 and the front hub 406 are joined together the recessed portions 411A, 415A align and form a cavity in which the pawl 418 is positioned and in which the pawl 418 is able to move. A pin 421 extends from the front hub 406 and/or the rear hub 402 about which the pawl 418 pivots. The pawl 418 includes an arm 420 that engages the holes 24 of the head 22 of the shaft 18 when the head 22 is received through the central opening 413 and into the internal cavity of the accessory tool 400.

The accessory tool 400 further includes a biasing member 422, such as a spring, that biases the arm 420 of the pawl 418 toward an engaged position (shown in FIG. 4D) where the arm 420 of the pawl 418 is radially inward and in engagement with the head 22 of the shaft 18 when the head 22 is received within the accessory tool 400. The insertion portion 414B of the front hub 406 includes a stop wall 415B that aligns with the stop wall 411B of the rear hub 402 against which the arm 420 of the pawl 418 abuts or engages when the pawl 418 is fully in the engaged position to prevent the pawl 418 from pivoting further about the pin 421. The stop walls 411B, 415B provide increased support to the arm 418 to prevent the arm 418 from deflecting or moving substantially relative to the shaft 18 when the arm 418 is in the engaged position and being used to rotate the shaft 18. The biasing member 422 may be a torsion spring having a first arm 422A secured to the body 414 of the front hub 406, the sleeve 404, and/or the rear hub 402 and a second arm 422B that engages a pin 424 that extends from a side of the pawl 418 to force the pawl 418 inward and toward the engaged position.

The pawl 418 may further include a lever 426 accessible to a user to move the pawl 418 toward a disengaged position (shown in FIG. 4E) where the arm 420 of the pawl 418 is moved radially outward and disengages the pawl 418 from the head 22 of the shaft 18 when the head 22 is received in the accessory tool 400. For instance, a user may apply a force to the lever 426 to overcome the biasing force of the spring to pivot the arm 420 of the pawl 418 about the pin 421 and away from the stop wall 415B and/or out of engagement with the head 22 of the shaft 18.

The sleeve 404 is positioned between the back plate 402 and the front hub 406. The sleeve 404 receives the insertion portion 410B of the back plate 402 and the insertion portion 414B of the front hub 406. The sleeve 404 may be secured between the rear hub 402 and the front hub 406 when fasteners are extended through the attachment holes 412 of the rear hub 402 and the attachment holes 416 of the front hub 406.

Figure 4D:
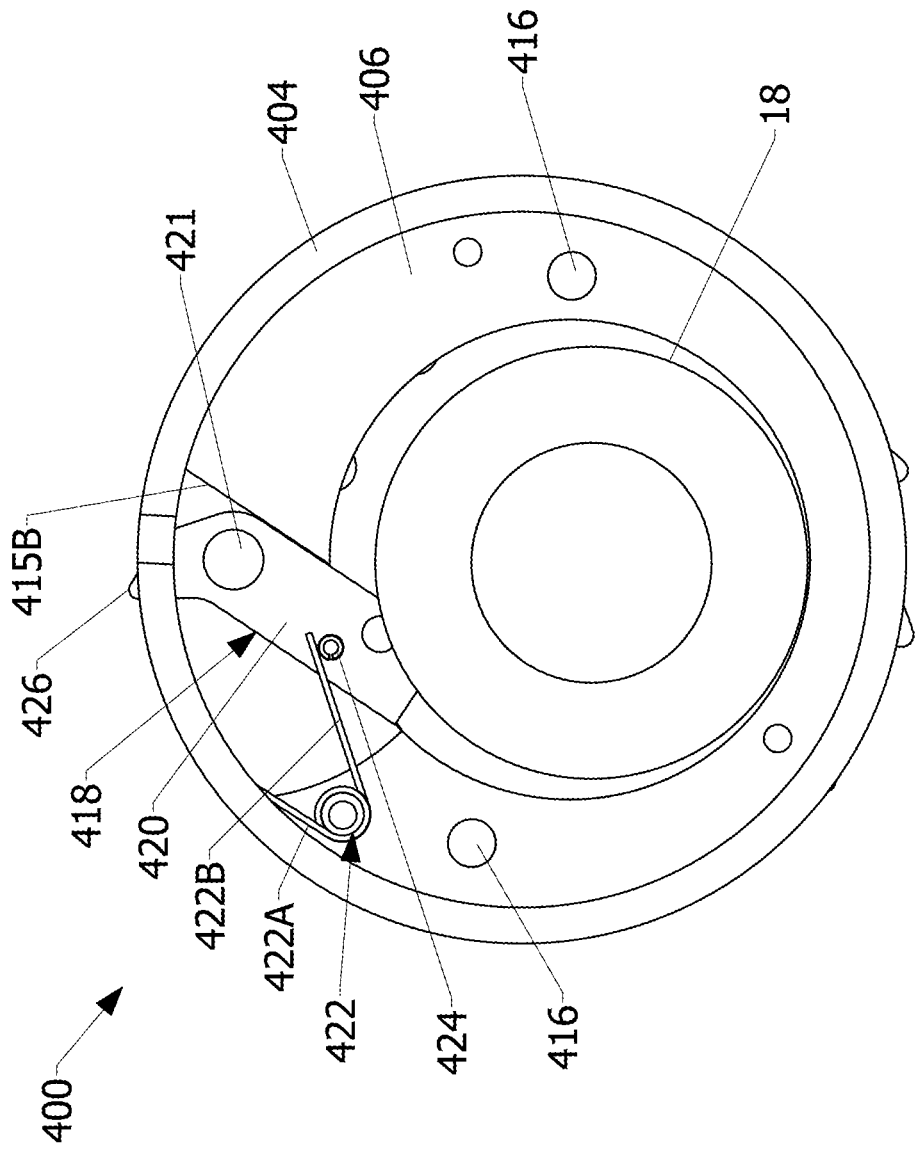
FIG. 4D is a cross-sectional view of the ratchet attachment of FIG. 4A mounted to the tie-down winch of FIG. 5 with the pawl in a first position.
Figure 4E:
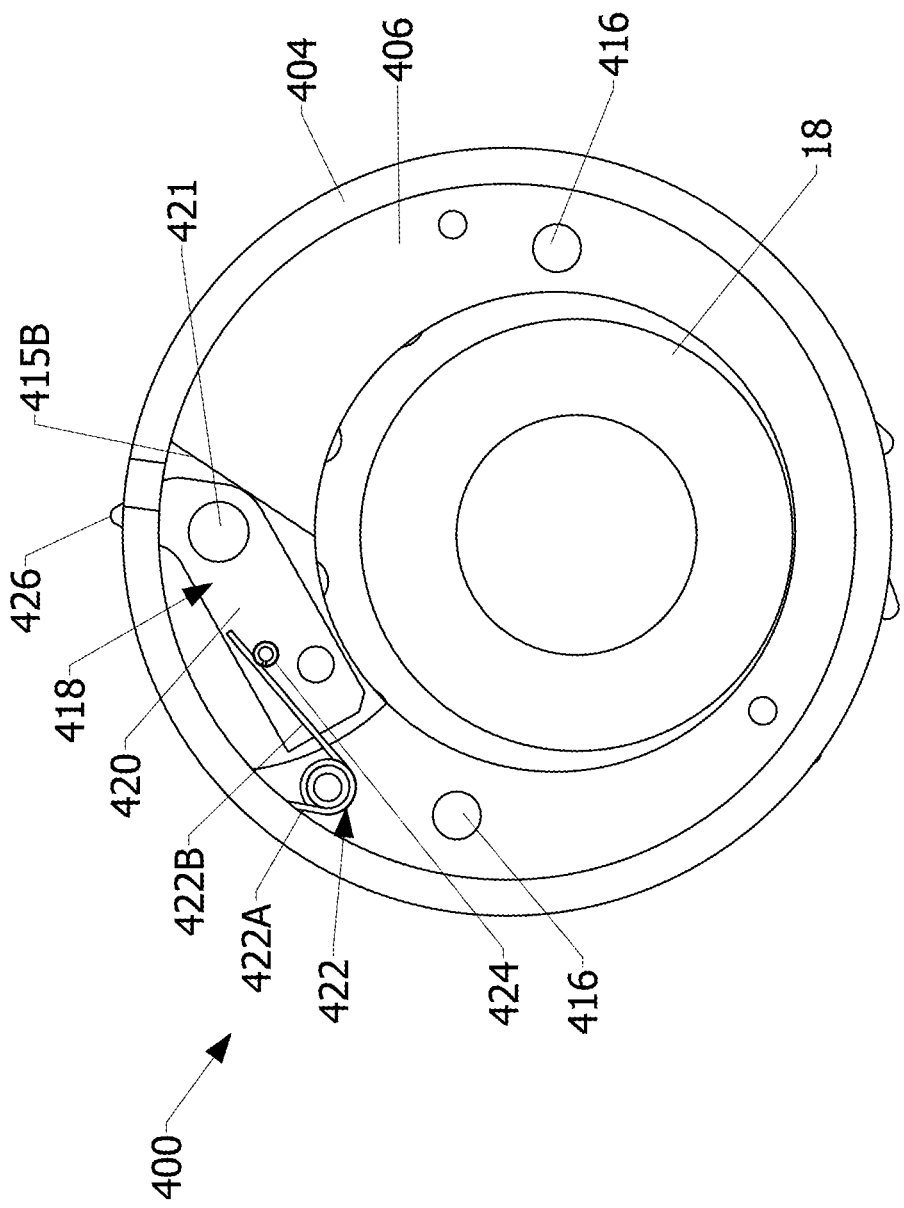
FIG. 4E is a cross-sectional view of the ratchet attachment of FIG. 4A mounted to the tie-down winch of FIG. 5 with the pawl in a second position.

The sleeve 404 may be able to rotate relative to the rear hub 402 and front hub 406 about the insertion portions 410B, 414B. The sleeve 404 may be rotated to move the pawl 418 to the disengaged position, for example, to unlock the accessory tool 400 from the shaft 418. The sleeve 404 includes an opening 430 into which the lever 426 extends. As the sleeve 404 is rotated (in the clockwise direction as shown in FIGS. 4D-4E) relative to the rear and front hubs 402, 406, the edge of the opening 430 of the sleeve 404 engages the lever 426 causing the pawl 418 to pivot toward the disengaged position. When the sleeve 404 is released, the biasing member 422 forces the pawl 418 toward the engaged position which may cause the lever 426 to apply a force to the sleeve 404 to cause the sleeve 404 to return to its original position. Thus, the sleeve 404 may be used to unlock the accessory tool 400 from the shaft 18 to detach the accessory tool 400 from the shaft 18 (e.g., when a strap is sufficiently tightened).

The lever 426 may extend into and/or through the opening 430 of the sleeve 404 such that the lever 426 is accessible to a user to permit a user may move the lever 426 with a finger (e.g., a thumb) or a tool such as a flathead screwdriver. The lever 426 may extend radially outward from the sleeve 404 to provide a surface for a user to engage to move the lever 426 toward the disengaged position.

In some forms, the sleeve 404 may further include a slot 432 into which the arm 420 of the pawl 418 may extend into and/or through when the pawl 418 is moved radially outward against the biasing force of the biasing member 422 and toward the disengaged position. For example, when a user moves the lever 426 (e.g., manually or with the sleeve 404) to disengage the pawl 418, the arm 420 of the pawl 418 may move within or through the slot 432. By allowing the pawl 418 to pivot into or through the sleeve 404, the overall diameter of the accessory tool 400 may be reduced. Having a small diameter is advantageous because often there is little space between the head 22 of the shaft 18 and a surface of the flatbed to which the winch 10 is attached.

In use, a user may attach the accessory tool 400 to a ratchet be inserting the drive head of the ratchet into the drive socket 408 of the back plate 402. The accessory tool 400 may be attached to the head 22 of the shaft 18 of the tie-down winch 10 by inserting the head 22 of the shaft 18 into the central opening 413 of the accessory tool 400. To insert the head 22 of the shaft 18 into the accessory tool 400, the sleeve 404 may be rotated relative to the rear and front hubs 402, 406 to move the lever 426 and to force the arm 420 of the pawl 418 radially outward toward the disengaged position. With the pawl 418 in the disengaged position, the head 22 of the shaft 18 may be received in the internal cavity of the accessory tool 400 via the central opening 413 (as shown in FIG. 4E). In some forms, the user may manually move the lever 426 to move the pawl 418 to the disengaged position to allow the head 22 of the shaft 18 to be received within the accessory tool 400.

Once the head 22 is within the central opening 413, the sleeve 404 and/or the lever 426 may be released to allow the biasing member 422 to bias the pawl 418 radially inward toward the engaged position. The accessory tool 400 may be rotated until the arm 420 of the pawl 418 is positioned within or snaps into a radial hole 24 of the head 22 of the shaft 18 of the winch 10 (as shown in FIG. 4D). The user may then turn the accessory tool 400 in the counterclockwise direction (when viewed as shown in FIG. 4D) using the ratchet to tighten the strap of the winch 10. As the accessory tool 400 is rotated counterclockwise, the pawl 418 engages an inner surface of the hole 24 of the head 22 and rotates the head 22 of the shaft 18 to tighten the strap and wind the strap about the shaft 18. The user may use the ratchet to tighten the strap by turning the accessory tool 400 without having to disconnect the accessory tool 400 from the head 22 of the shaft 18 until the strap is fully tightened. For example, the user may move the ratchet 90 degrees in the counterclockwise direction to rotate the shaft 18 a quarter turn. The user may then move the ratchet 90 degrees in the clockwise direction without moving or detaching the accessory tool 400 from the shaft 18 and again move the ratchet 90 degrees in the counterclockwise direction to rotate the shaft 18 another quarter turn. This process may be repeated until the strap is sufficiently taut to secure the load of the vehicle, for example, the load on a flatbed.

To disconnect the accessory tool 400 from the head 22 of the shaft 18, a user may rotate the sleeve 404 to move the lever 426 or manually move the lever 426 to place the pawl 418 in the disengaged configuration as shown in FIG. 4E. The accessory tool 400 may then be moved axially away from the shaft 18 to disconnect the accessory tool 400 from the shaft 18. In another approach, the accessory tool 400 may be turned clockwise (either by the ratchet or by hand) about an ⅛ of a turn to until the end of the arm 420 of the pawl 418 rests on the outer surface of the head 22 of the shaft and is no longer within the hole 24 of the head 22. The accessory tool 400 may then be moved axially away from the shaft 18 to disconnect the accessory tool 400 from the shaft 18. The accessory tool 400 may then be moved to other winches 10 to tighten other straps if desired.

While the accessory tool 400 has been described in use with the winch 10 of FIG. 5, it should be appreciated that the accessory tool 400 may also be used with the winch 300 of FIG. 3 and with the winch 10 of FIG. 5 including the coupler 200 affixed thereto.

Figure 6C:
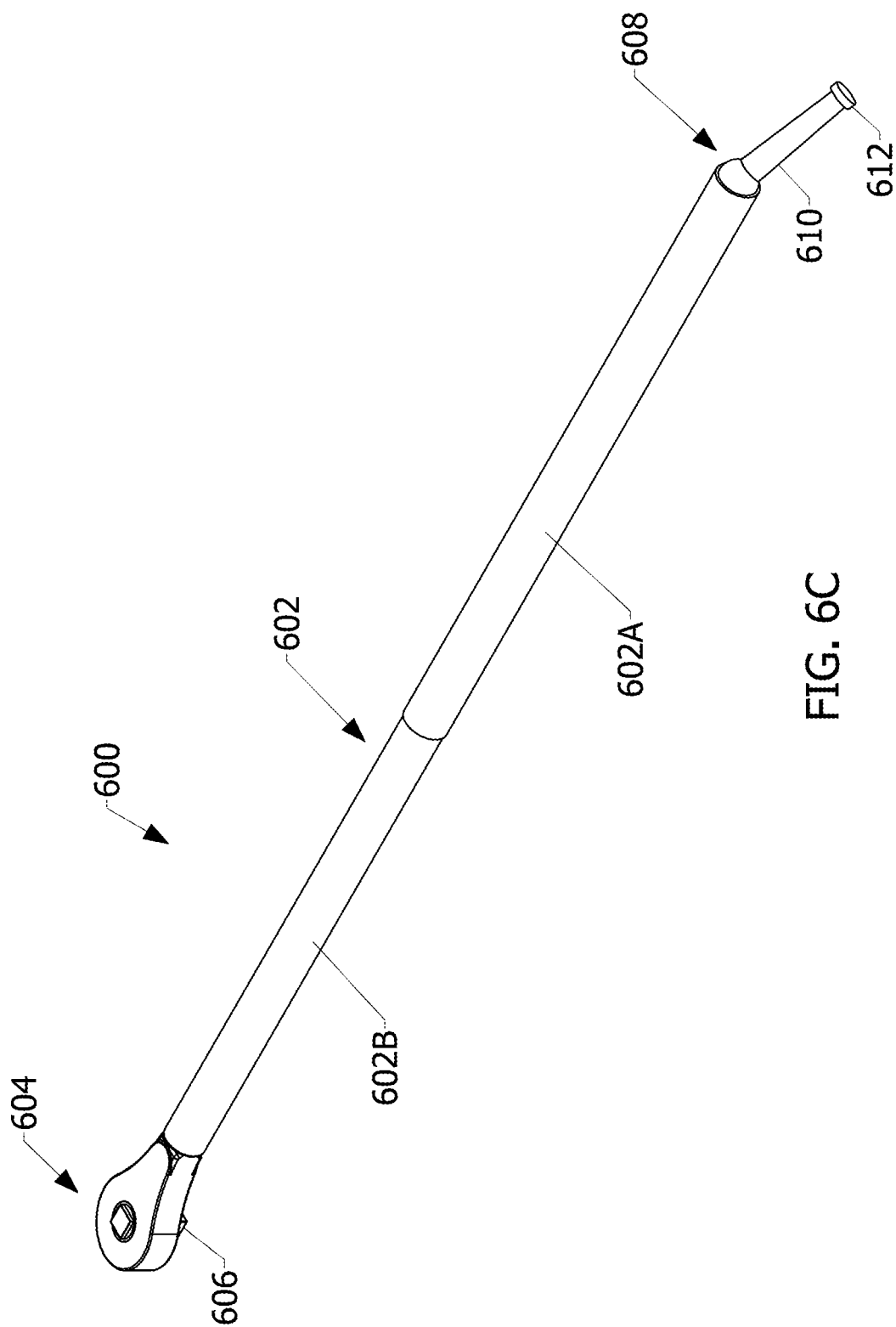
FIG. 6C is a perspective view of the winch tightening tool of FIG. 6A shown in the extended configuration.

With respect to FIGS. 6A-7, a winch tightening tool 600 with an extendable handle 602 may be used with the couplers 100, 200, the tie-down winch 300, and/or the accessory tool 400 to tighten the straps on the winch. The winch tightening tool 600 includes a ratchet 604 on a first end with a square drive head 606. The square drive head 606 may be sized to be inserted into the drive socket of the couplers 100, 200, the tie-down winch 300, and/or the accessory tool 400 and used to tighten the winch. The ratchet 604 may permit the drive head 606 to be rotated in one direction to tighten the winch. While the ratchet 604 is shown as having a square head, as described above, in other forms the drive head 606 may have different shapes that correspond to the drive socket of the coupler or tie-down winch to permit the drive head 606 to be inserted into the drive socket to tighten the winch.

The winch tightening tool 600 includes a winch bar 608 on the second end. The winch bar 608 includes a tapered rod 610 extending at an angle relative to the length of the handle 602. The end of the rod 610 is mushroom tipped and includes a flange 612 extending radially outward from the rod 610. The tapered rod 610 may be inserted into the radial holes of the head of the winch (e.g., radial holes 324 of the winch 300 of FIG. 3, radial holes 24 of the winch 10 of FIG. 5) and used to tighten the winch. For example, a user may insert the rod 610 through the radial holes of the head of the winch and rotate the shaft counterclockwise about a quarter to half turn to wind the strap on the shaft. The user may then withdraw the rod 610 from the radial holes and reinsert the rod 610 into another radial hole to rotate continue to rotate the shaft another quarter to half turn. The user may repeat this process until the winch is sufficiently tightened. The flange 612 on the tip of the rod 610 may be extended through the head of the shaft of the winch and catch on the edge of the hole to aid in keeping the rod 610 within the head when the user is tightening the winch. The user may align the flange 612 with the radial holes of the winch when inserting and withdrawing the rod 610.

Figure 7A:
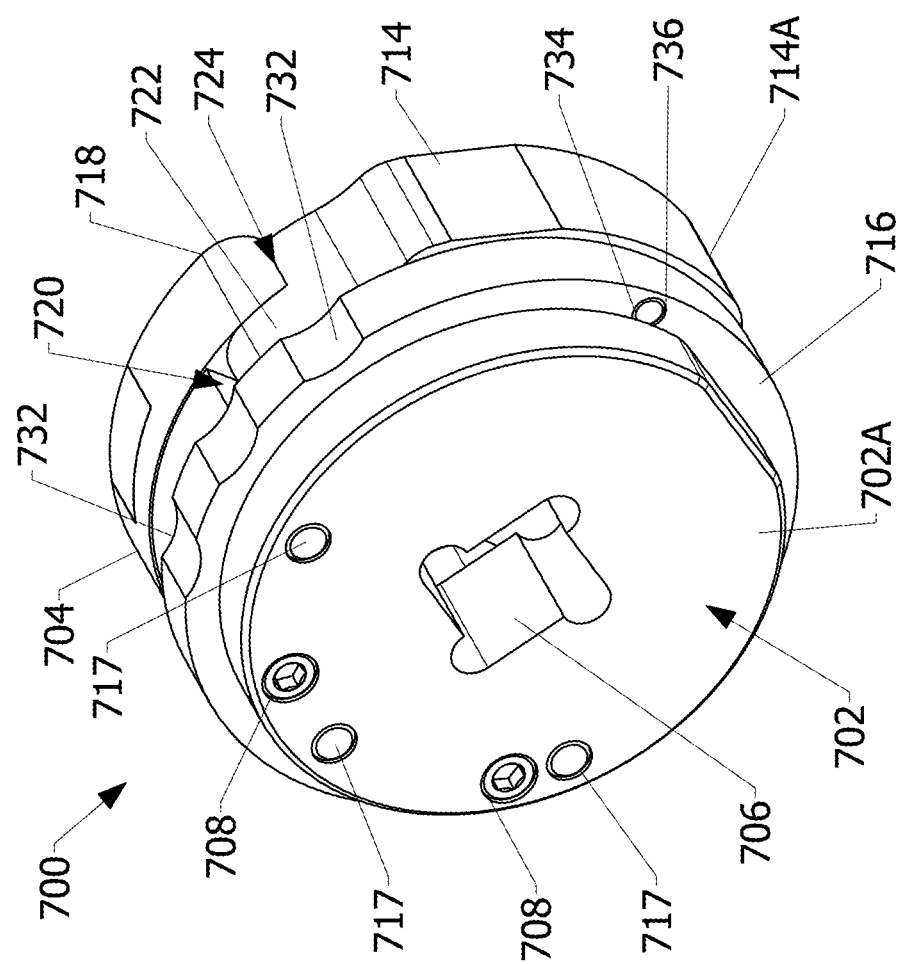
FIG. 7A is a rear perspective view of a ratchet attachment according to another embodiment shown in a closed configuration.

The handle 602 of the winch tightening tool 600 may be extendable. Extending the handle 602 may provide increased leverage when tightening the straps of a winch. Retracting the handle 602 may decrease the size of the tool 600 and make it easier to store when not in use. The handle 602 may also be retracted or the length of the handled decreased when the winch tightening tool 600 is being used to tighten straps where there is little room rotate the tool 600, for example, when the flatbed is parked close to another flatbed, wall, or other object. The length of the tool 600 may be reduced to enable an operator to still be able to tighten the straps even where there is little room to rotate the tool 600. In some forms, such as that shown in FIGS. 6A-7, the tool 600 may have a telescoping handle 602 to permit the length of the handle 602 of the tool 600 to be adjusted. As shown, the handle 602 includes an outer rod 602A and an inner rod 602B. The inner rod 602B is sized to be received within the outer rod 602A allowing the inner rod 602B and outer rod 602A to slide axially relative to one another to adjust the length of the handle 602. As shown in FIG. 6A-6B, the handle 602 is in the retracted configuration with the inner rod 602B received within the outer rod 602A. As shown in FIG. 7A, the handle 602 is in the extended configuration with the inner rod 602B partially withdrawn from the outer rod 602A. The length of the handle 602 may be adjustable between about 20 inches to about 60 inches, and preferably from about 28 inches to about 40 inches. In some forms, the length of the handle 602 may be set or locked in place once inner and outer rods 602A,B have been moved relative to one another to set the desired combined length of the rods 602A,B. For example, the handle 602 may include an inner rod lock mechanism to set the axial length of the handle 602. For instance, the outer rod 602A may be twisted relative to the inner rod 602B (e.g., rotated clockwise) to lock the rods 602A,B in place relative to one another to set the length of the handle 602. In other embodiments, the handle 602 is not extendable. For example, the handle 602 has a fixed length in the range of about 28 inches to about 42 inches.

The handle 602 of the winch tightening tool 600 may be made of a metal such as a steel. In some forms, the handle 602 is chrome plated. In some forms, the outer surface of the handle 602 includes a gripping area that is knurled to provide increased grip.

In some forms, a chain binder may be attached to the second end of the handle 602. The chain binder may be used to tighten chains used to secure a load to the trailer. Attaching the chain binder to the winch tightening tool 600 provides a single tool that may be used by an operator to tie down a load using straps and/or chains.

With respect to FIGS. 7A-7D, a ratchet attachment 700 is shown according to another embodiment. The ratchet attachment 700 is similar in many respects to the ratchet attachment 400 of FIG. 4A-4E such that the differences will be highlighted. The ratchet attachment 700 may be attached to a drive head of a ratchet (e.g., ratchet 604). The other side of the ratchet attachment 700 may attached to the head 22 of a shaft 18 tie-down winch 10. The ratchet attachment 700 is adjustable between an open configuration shown in FIGS. 7A-7B and a closed configuration shown in FIGS. 7C-7D. The ratchet attachment 700 may be placed in the open configuration to position the head 22 of the tie-down winch 10 within the ratchet attachment 700. The ratchet attachment 700 may be placed in the closed configuration to secure the ratchet attachment 700 to the head 22 and to turn the head 22 using the ratchet to tighten the strap of the tie-down winch 10. The ratchet attachment 700 may be placed in the open configuration to withdraw the head 22 from the ratchet attachment 700 to detach the ratchet attachment 700 from the head 22 of the tie-down winch 10.

The ratchet attachment 700 includes a rear hub 702 having a substantially cylindrical body. The rear hub 702 includes a drive socket 706 for receiving a drive head of a tool such as a ratchet or impact driver similar to those described above. The drive head of the tool may be inserted into the drive socket 706 and used to rotate the ratchet attachment 700.

The ratchet attachment 700 includes a first arcuate wall 704 attached to the rear hub 702. The first arcuate wall 704 extends axially from the rear hub 702. The ratchet attachment 700 further includes a second arcuate wall 714 that is pivotably connected to the first arcuate wall 704 and/or rear hub 702. The second arcuate wall 714 also extends axially from the rear hub 704 such that the first and second arcuate walls 704, 714 define a recess therebetween for receiving the head 22 of the shaft 18 of the tie-down winch 10. The ratchet attachment 700 further includes configuration adjustment member, such as a ring 716 rotatably attached to the rear hub 702 and/or the first arcuate wall 704 to adjust the configuration of the ratchet attachment 700. The ring 716 may be rotated relative to the rear hub 702 to cause the second arcuate wall 714 to pivot relative to the first arcuate wall 704 to move the ratchet attachment 700 between open and closed configurations as described in further detail below.

The first arcuate wall 704 is fixed to the rear hub 702 by fasteners 708 that extend through the rear hub 702 and into the arcuate wall 704 to inhibit the arcuate wall 704 from moving substantially relative to the rear hub 702. The arcuate wall 704 may have a radially inner surface 710 that is sized to receive and/or has a curvature that corresponds to the outer diameter of the head 22 of the shaft 18 of the tie-down winch 10. A tooth or protrusion 712 extends radially inward from the first arcuate wall 704. The protrusion 712 is fixed to the first arcuate wall 704 by a fastener 713. The protrusion 712 is spaced apart from the rear hub 702 and is sized and positioned to be inserted into a hole 24 of the head 22 of the tie-down winch 10 when the head 22 of the tie-down winch 10 is received in the recess between the first and second arcuate walls 704, 714. The protrusion 712 applies a force to the inside surface of the hole 24 of the head 22 as the ratchet attachment 700 is rotated to turn the head 22 of the tie-down winch 10 as the rachet attachment 700 is turned to tighten the strap.

The second arcuate wall 714 is pivotably attached to the first arcuate wall 704. In the form shown, a pin 726 is attached to the first arcuate wall 704 and extends through a hole of the second arcuate wall 714 such that the second arcuate wall 714 is able to pivot about the pin 726. The first arcuate wall 704 includes a protruding portion 718 adjacent a recess 720. The second arcuate wall 714 includes a protruding portion 722 adjacent a recess 724. The protruding portion 722 of the second arcuate wall 714 is received in the recess 720 of the first arcuate wall 704. The recess 724 of the second arcuate wall 714 is sized to receive the protruding portion 718 of the first arcuate wall 704 such that the protruding portions 718, 722 of the walls 704, 714 overlap. The pin 726 is fastened to the protruding portion 718 of the first arcuate wall 704 and extends into the protruding portion 722 of the second arcuate wall 714. This configuration permits the first and second arcuate walls 704, 704 to be in substantially the same plane as they pivot relative to one another. The pin 726 may be attached to the first arcuate wall 704 by pressing a portion of the pin 726 into a hole 705 of the first arcuate wall 704. As another example, an end of the pin 726 may be threaded and the hole 705 of the first arcuate wall 704 threaded such that the pin 726 is threaded into the hole 705 of the first arcuate wall 704.

As mentioned above, the ring 716 is rotatably coupled to the rear hub 702. The ring 716 may be positioned between and held in place by the rear hub 702 and the first arcuate wall 704. The rear hub 702 includes a back plate portion 702A and an insertion portion 702B having a smaller radial dimension than the back plate portion 702A. The inner diameter of the ring 716 is sized to receive the insertion portion 702B but is not able to pass over the back plate portion 702A. The ring 716 is sandwiched between the back plate portion 702A and the first arcuate wall 716 and able to rotate or slide about the insertion portion 702B. A user may thus rotate the ring 716 relative to the rear hub 702 by sliding the ring 716 along the insertion portion 702B. In some forms, the ring 716 includes an arcuate groove (not shown)

that extends about a portion of the circumference of the ring 716. Pins 717 attached to the rear hub 702 extend into or through the arcuate groove to guide the ring 716 as it is rotated relative to the rear hub 702. While the ring 716 is provided as an example of the configuration adjustment member, the configuration adjustment member may have other forms such as an arcuate member that slides along the rear hub 702 rather than a ring. The ring 716 may include recesses 732 about the outer surface of the ring 716 to provide a gripping portion that enables a user to better grip the ring 716 when rotating the ring 716 relative to the rear hub 702. For example, a user may place a finger within the recess 732 when rotating the ring 716 which may inhibit the user's finger from slipping relative to the ring 716 and/or better enable a user to apply a force to the ring 716 in the desired direction of rotation.

The ring 716 further includes a pin 734 that extends axially from the ring 716 toward the second arcuate wall 714. As shown in FIG. 7C, the second arcuate wall 714 includes a guide groove 728 for receiving the pin 734 of the ring 716. The pin 734 may be fastened to the ring 716 such that the pin 734 does not move substantially relative to the ring 716. For example, the pin 734 may be pressed into a hole 736 of the ring 716 to secure the pin 734 to the ring 716. As another example, an end of the pin 734 includes threads such that the pin 734 is threaded into threads of the hole 736 of the ring 716. The pin 734 slides along the groove 728 of the second arcuate wall 714 as the ring 716 is rotated relative to the rear hub 702. The pin 734 drives or forces the second arcuate wall 714 to pivot relative to the first arcuate wall 704 as the ring 716 is rotated. As the second arcuate wall 714 pivots, an end 714A of the second arcuate wall is moved radially inward or outward. For example, the groove 728 may include an outer camming surface 728A and an inner camming surface 728B the pin 734 slides along to move the second arcuate wall 714. As the ring 716 is rotated in the clockwise direction (when viewed from the rear as shown in FIG. 7A), the pin 734 slides along and engages the inner camming surface 728B to force the second arcuate wall 714 radially inward. As the ring 716 is rotated counterclockwise, the pin 734 slides along and engages the outer camming surface 728A to force the second arcuate wall 704 radially outward.

Figure 7B:
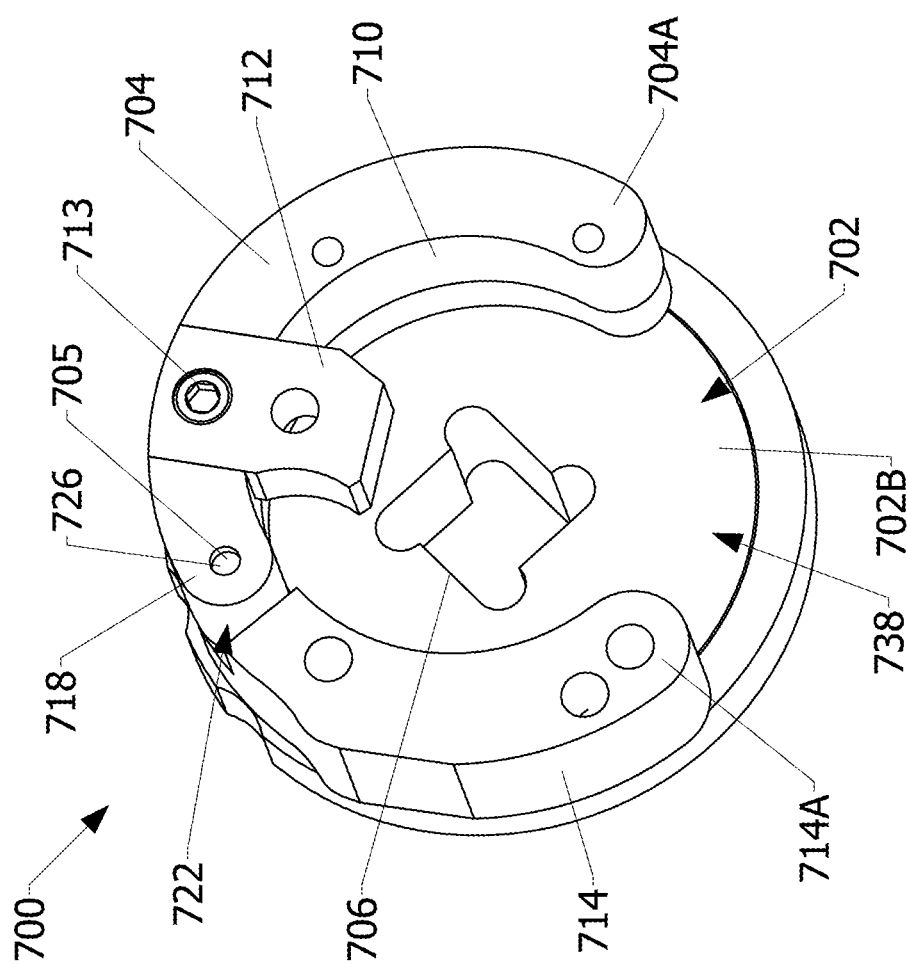
FIG. 7B is a front perspective view of the ratchet attachment of FIG. 7A shown in the closed configuration.
Figure 7C:
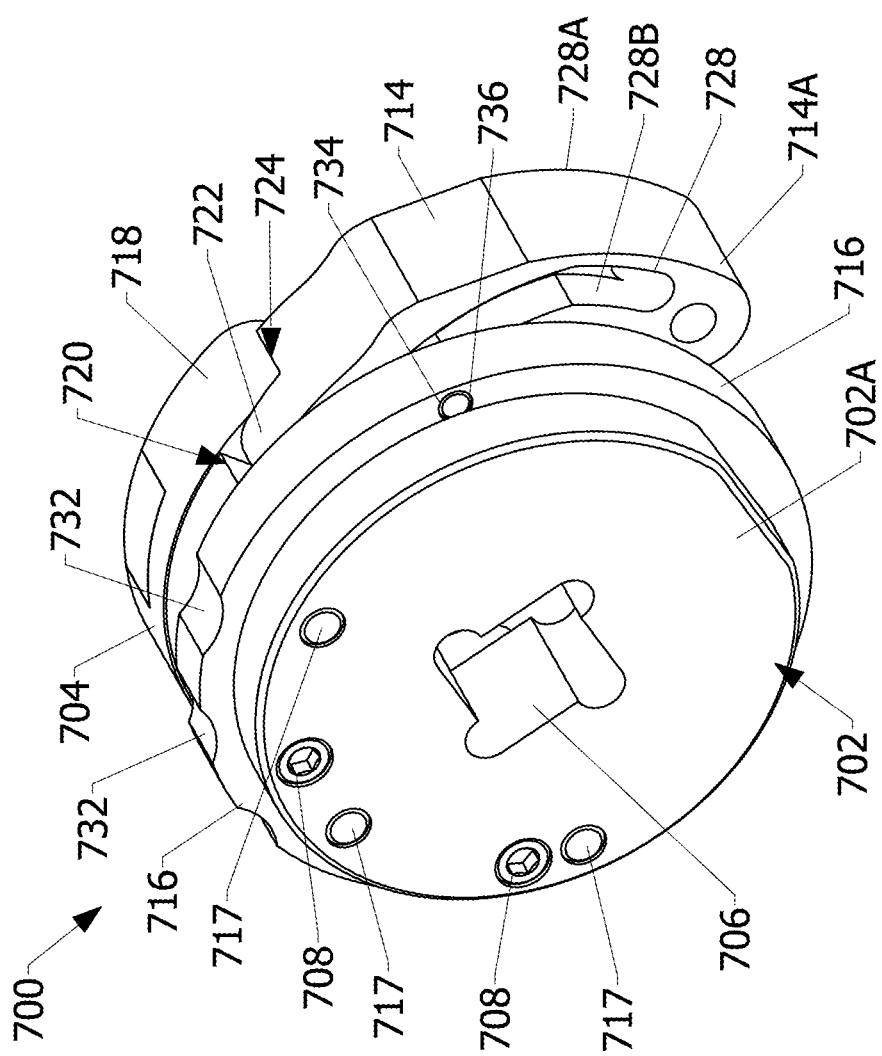
FIG. 7C is a rear perspective view of the ratchet attachment of FIG. 7A shown in an open configuration.

As shown in FIGS. 7A-7B, the ratchet attachment 700 is in a closed configuration with the ring 716 rotated clockwise when viewed from the rear. In the closed configuration, the end 714A of the second arcuate wall 714 is drawn radially inward. As shown, the second arcuate wall 714 aligns with the first arcuate wall 704 such that the arc formed by the first and second arcuate walls 704, 714 is substantially continuous. When in the closed configuration, the gap 738 between the end 714A of the second arcuate wall 714 and an end 704A of the first arcuate wall 704 is narrow and sized such that the head 22 of the shaft 18 is not able to pass through the gap 738. For instance, the diameter of the head 22 is larger than the gap 738.

Figure 7D:
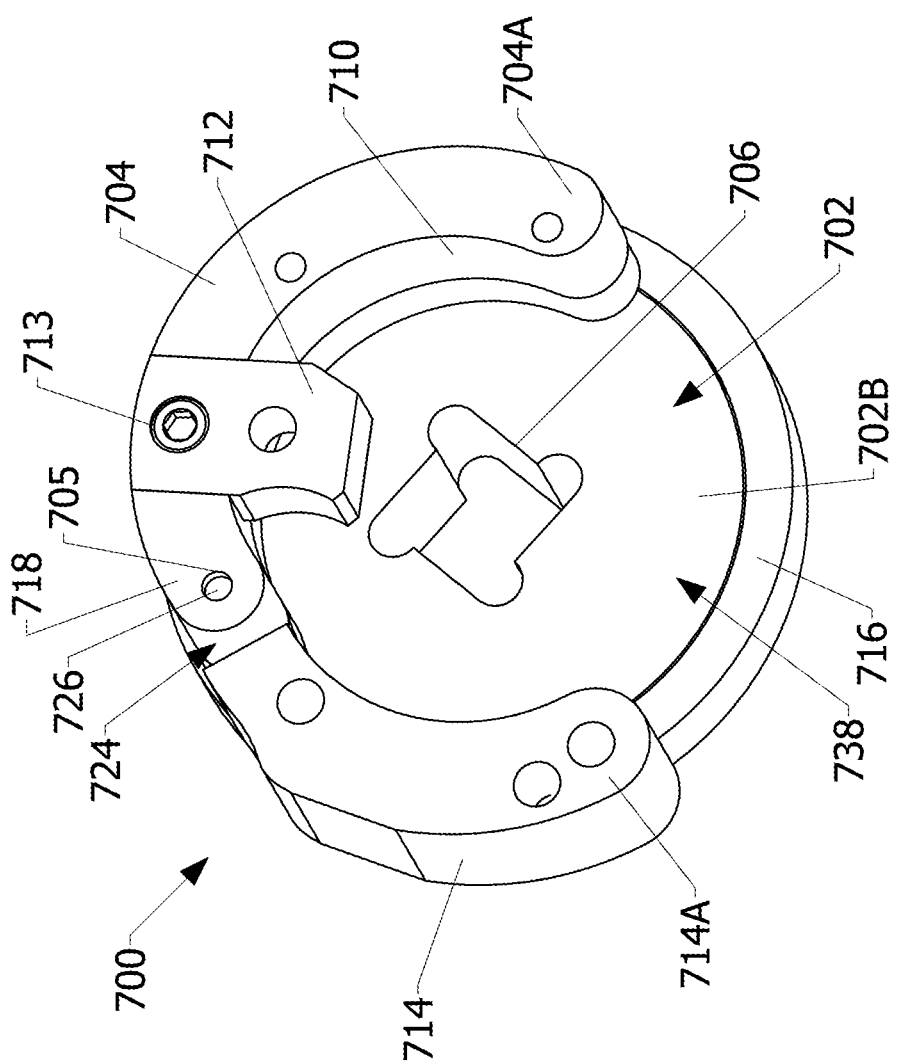
FIG. 7D is a front perspective view of the ratchet attachment of FIG. 7A shown in the open configuration.

As shown in FIGS. 7C-7D, the ratchet attachment 700 is in the open configuration with the ring 716 rotated counterclockwise when viewed from the rear. In the open configuration, the end 714A of the second arcuate wall 714 is pivoted radially outward such that the second arcuate wall 714 is out of alignment with the first arcuate wall 704. In the open configuration, the gap 738 between the end 714A of the second arcuate wall 714 and the end 704A of the first arcuate wall 704 is increased relative to the closed configuration such that the head 22 of the tie-down winch 10 is able to pass through the gap 738. For instance, the gap 738 is larger than the diameter of the head 22.

The ratchet attachment 700 may include a biasing member such as a spring (e.g., torsion spring) that biases ratchet attachment 700 into the closed configuration. For example, the biasing member may apply a force to the ring 716 forcing the ring 716 to rotate in the direction to cause the second arcuate wall 714 to move radially inward. To move the ratchet attachment 700 toward the open configuration, a user may apply a force to the ring 716 to overcome the biasing force.

In use, the ratchet attachment 700 may be placed in the open configuration when attaching the ratchet attachment 700 to or removing the ratchet attachment 700 from the head 22 of the shaft 18 of the tie-down winch 100. In the open configuration, the increased size of the gap 738 enables the head 22 to be passed radially inward and through the gap 738 and into the recess formed between the first and second arcuate walls 704, 714. When attaching the ratchet attachment 700 to the head 22, the tooth or protrusion 712 may be aligned with and inserted into a hole 24 in the head 22 as the head 22 is received into the recess between the first and second arcuate walls 704, 714. Once the head 22 is received within the ratchet attachment 700, the ring 738 may be rotated to place the ratchet attachment 700 in the closed configuration. As the ring 738 is rotated, the end 714A of the second arcuate wall 714 moves radially inward reducing the size of the gap 738. In the closed configuration, the first and second arcuate walls 704, 714 extend about more than 50% of the circumference of the head 22 and, preferably, more than 70%. In some forms, the first and second arcuate walls 704, 714 encircle the head 22 when in the closed configuration. In the closed configuration, the head 22 is not able to pass through the gap 738 thus keeping the ratchet attachment 700 secured to the head 22. In some forms, when the ratchet attachment 700 is in the closed configuration, the first and second arcuate walls 704, 714 clamp or apply a force to the outer surface of the head 22. This may be beneficial in inhibiting the ratchet attachment 700 from sliding (e.g., axially or circumferentially) relative to the head 22 when the head 22 is rotated to tighten the strap or as a ratchet is being operated. While in the form shown only the second arcuate wall 714 pivots when the ring 716 is rotated, in other forms, both the first and second arcuate walls 704, 714 pivot when the ring 716 is rotated. For example, in the open configuration, both the first and second walls 704, 714 are moved radially outward and in the closed configuration both the first and second walls 704, 714 are moved radially inward.

To remove the ratchet attachment 700 from the head 22, the ring 716 may be rotated to place the ratchet attachment 700 in the open configuration. Once in the open configuration, the ratchet attachment 700 may be slid or moved such that head 22 moves toward and/or through the gap 738 to withdraw the protrusion 712 from the hole 24 of the head 22.

Figure 7E:
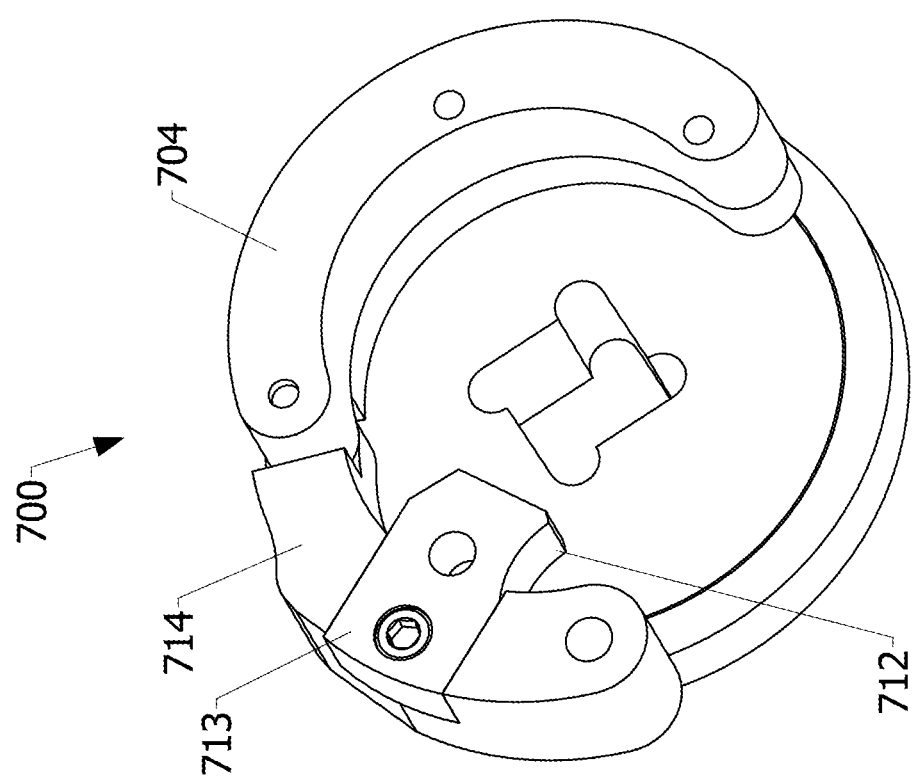
FIG. 7E is a front perspective view of the ratchet attachment of FIG. 7A modified to include a protrusion on a movable wall.
Figure 8A:
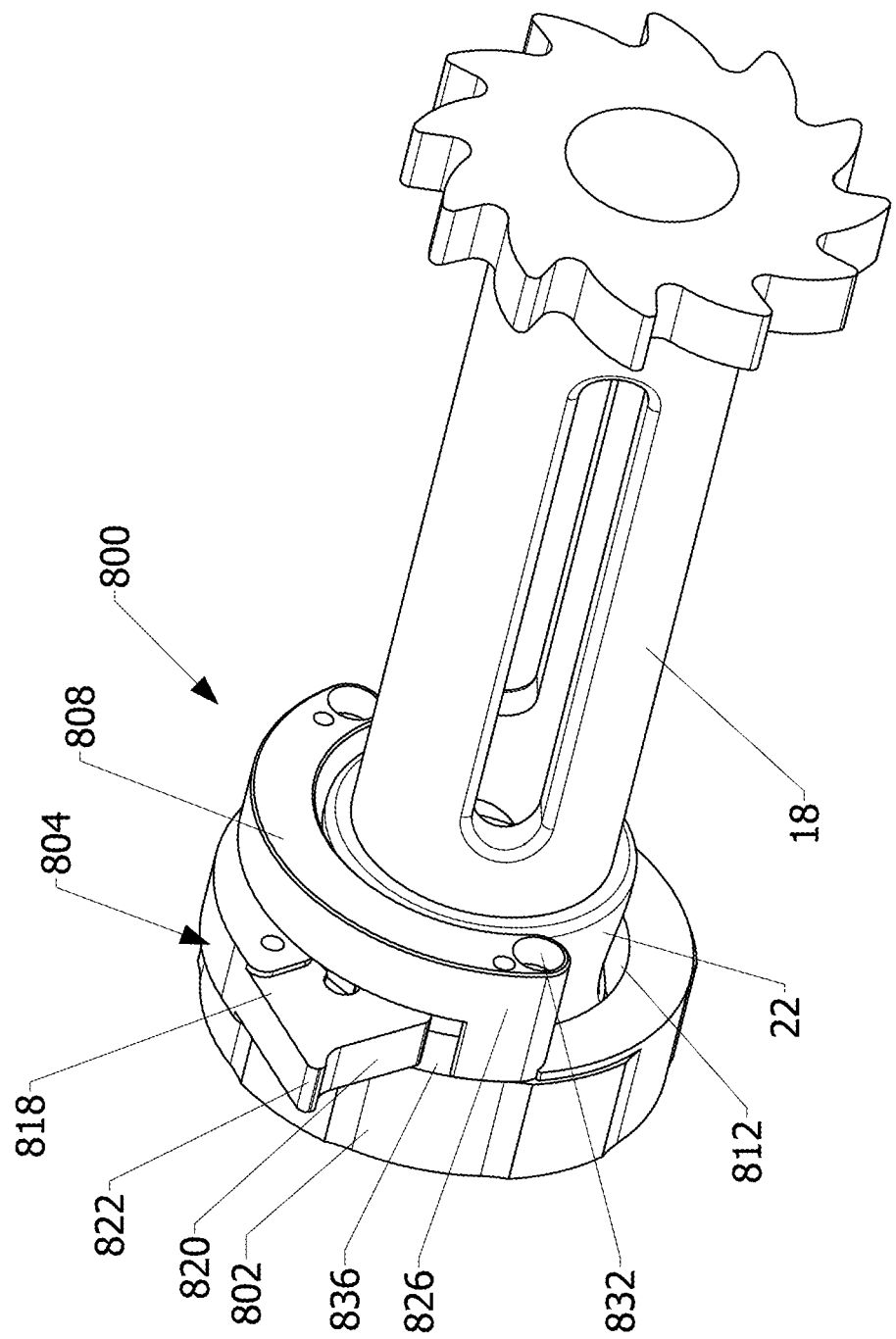
FIG. 8A is a front perspective view a ratchet attachment according to another embodiment shown in a disengaged configuration.
Figure 8B:
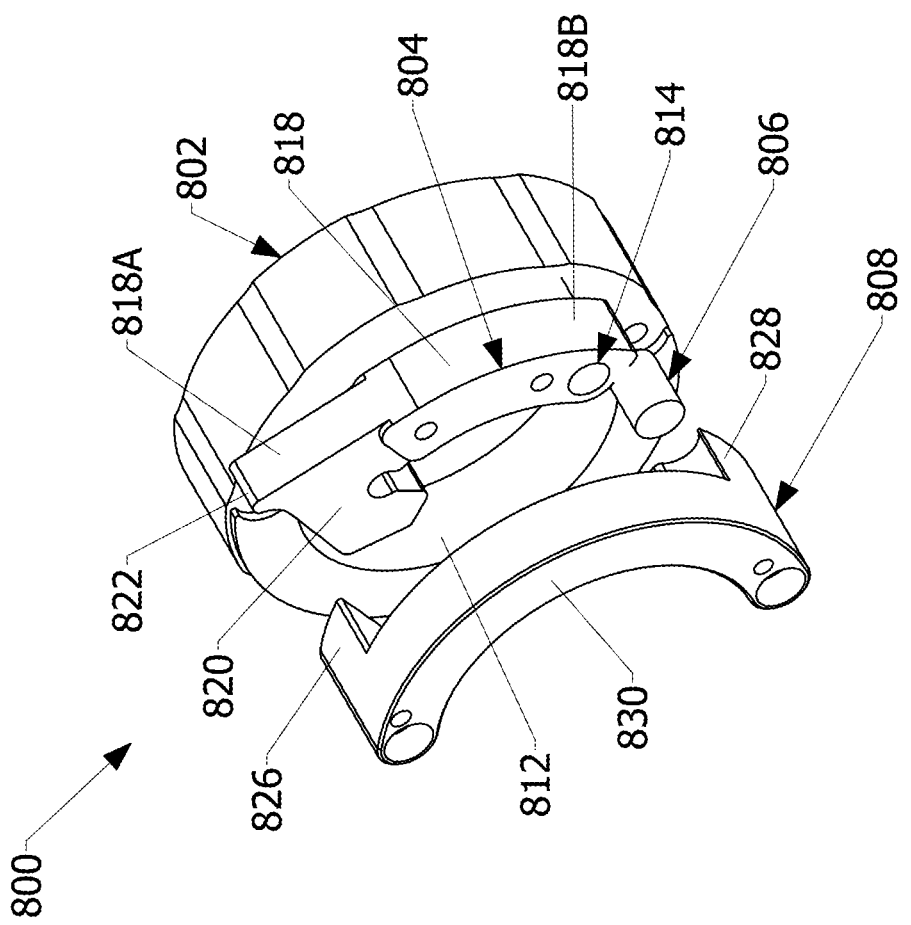
FIG. 8B is a front perspective exploded view of the ratchet attachment of FIG. 8A.
Figure 8C:
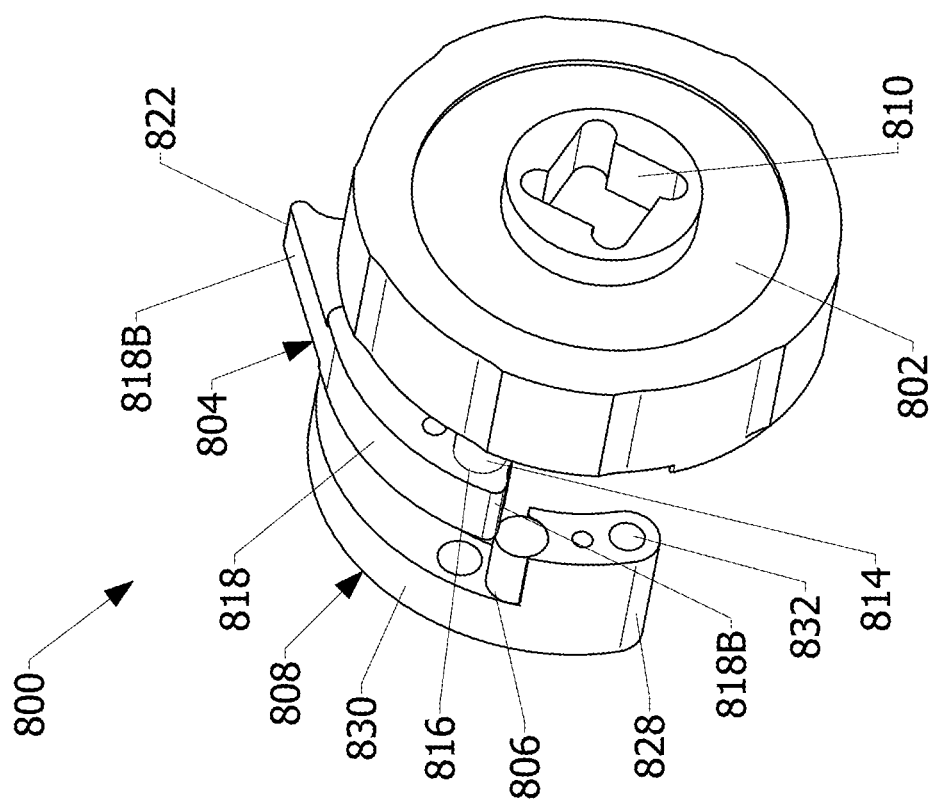
FIG. 8C is a rear perspective exploded view of the ratchet attachment of FIG. 8A.
Figure 8D:
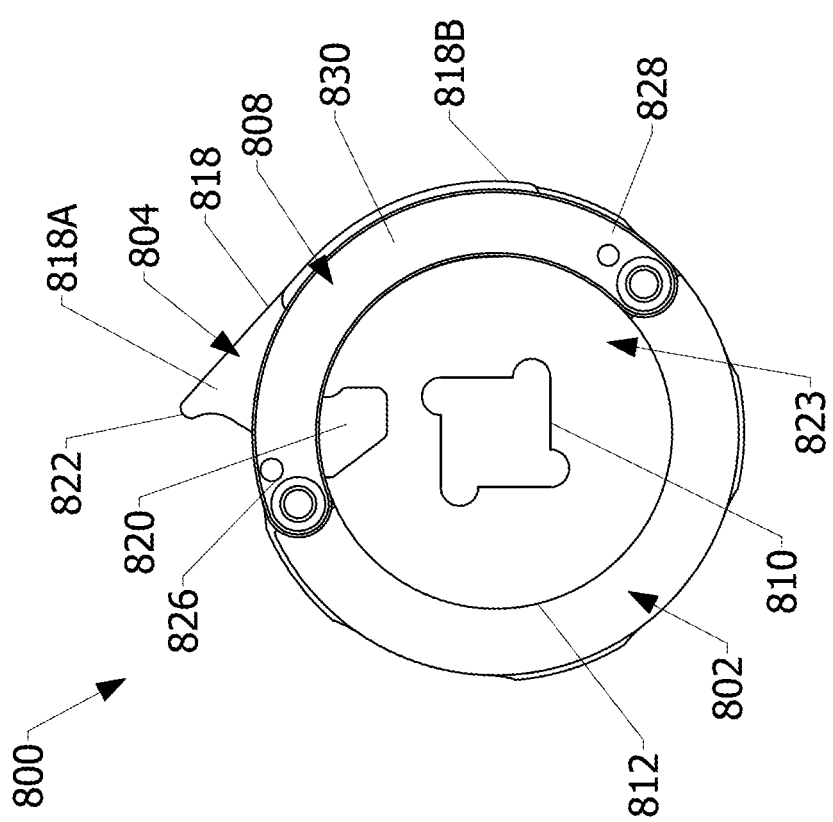
FIG. 8D is a front elevation view of the ratchet attachment of FIG. 8A shown in the disengaged configuration.
Figure 8E:
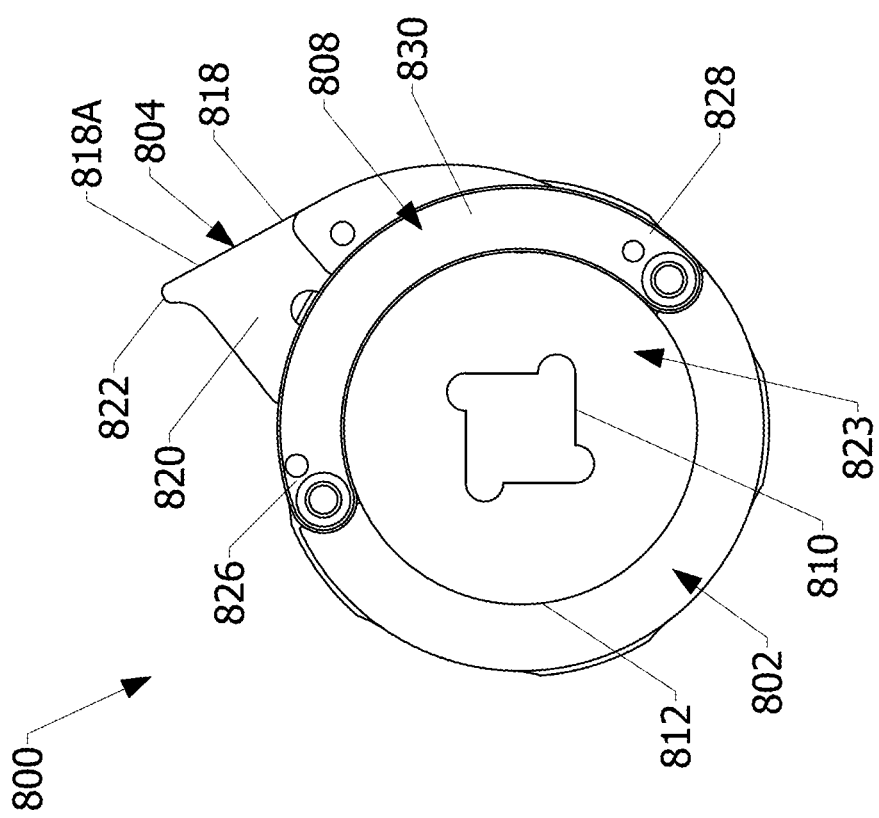
FIG. 8E is a rear elevation view of the ratchet attachment of FIG. 8A shown in the engaged configuration.

With respect to FIG. 7E, the ratchet attachment 700 is shown according to an alternative embodiment where the protrusion 712 is mounted on the movable second wall 714. Thus, the protrusion 712 moves with the second wall 714 as the ratchet attachment 700 is moved between the open and closed configurations. The second wall 714 may be moved to the open configuration such that the head 22 of the shaft 18 is able to be received into the recess formed between the first and second walls 704, 714. The second wall 714 may be moved to the closed configuration to insert the protrusion 712 into one of the holes 24 of the head and to use the ratchet attachment 700 to turn the shaft 18. The ratchet attachment 700 may be removed from the head 22 of the shaft 18 by moving the second wall 714 to withdraw the protrusion 712 from the hole 24 of the head 22 and withdrawing the head 22 from the recess of the ratchet attachment 700.

With respect to FIGS. 8A-8E, a ratchet attachment 800 is shown according to another embodiment. The ratchet attachment 800 is similar in many respects to the ratchet attachment 400 of FIG. 4A-4E such that the differences will be highlighted. The ratchet attachment 800 may be attached to a drive head of a ratchet (e.g., ratchet 604). The other side of the ratchet attachment 800 may attached to the head 22 of a shaft 18 tie-down winch 10.

The ratchet attachment 800 includes a hub or plate 802, a pawl 804, a biasing member 806, and a support bracket 808. The plate 802 may have a substantially cylindrical body having a recess 812 sized to receive a portion of the head 22 of the shaft 18 of the tie-down winch and to allow the head 22 of the shaft 18 to rotate therein. The plate 802 includes a drive socket 810 for receiving a drive head of a tool such as a ratchet or impact driver similar to those described above. The drive head of the tool may be inserted into the drive socket 810 of the plate 802 and used to rotate the ratchet attachment 800. The plate 802 may further include holes for mounting the biasing member 806 and a dowel pin 814 to the plate 802.

The pawl 804 includes an arm 818 and a tooth or protrusion 820 mounted to an end portion 818A of the arm 818. The protrusion 820 may extend radially inward from the arm 818. An end portion 818B of the arm 818 opposite the protrusion 820 includes an opening 816 for receiving a portion of the dowel pin 814 extending from the plate 802. The pawl 804 may be mounted to the dowel pin 814 such that the pawl 804 may pivot about the dowel pin 814 to move the protrusion 820 radially inward and radially outward. The biasing member 806 may contact the end portion 818B of the arm 818 to bias the pawl 804 to a closed configuration where the protrusion 820 of the pawl 804 is radially inward (see FIG. 8D). The biasing member 806 may be a spring. For example, the biasing member 806 may be an elastically compressible cylindrical spring formed from, as examples, urethane, rubber, and/or a plastic. The end portion 818A of the arm 818 may be moved radially outward overcoming the biasing force of the biasing member 806 to move the pawl 804 to an open configuration where the protrusion 820 is moved radially outward (see FIG. 8E). The end portion 818A of the arm 818 may include an extension 822 that may aid a user in gripping the arm 818 to manually move the end portion 818A of the arm 818 radially outward. When the user releases the arm 818, the biasing member 806 elastically returns to its resting position forcing the end portion 818B outward and causing the arm 818 to pivot about the dowel pin 814 such that the end portion 818A is moved radially inward toward the closed configuration.

The supporting bracket 808 includes a first mounting post 826, a second mounting post 828, and an arcuate wall 830 extending from the first mounting post 826 to the second mounting post 828. The first mounting post 826 includes an opening 832 into which a fastener may be extended to attach the supporting bracket 808 to the plate 802. The second mounting post 828 includes an opening 834 into which a fastener may be extended to attach the supporting bracket 808 to the plate 802. The arcuate wall 830 may be supported by the first mounting post 826 and second mounting post 828 such that the arcuate wall 830 is spaced apart from the plate 802 by a gap 836. The pawl 804 is positioned within the gap 836 such that the pawl 804 is able to pivot within the gap 836. The plate 802 and the support bracket 808 house the pawl 804 and may guide the pawl 804 as the pawl 804 pivots to move the protrusion 820 between open and closed configurations. The arcuate wall 830 may be substantially aligned with the recess 812 of the plate 802 such that supporting bracket 808 and the plate 802 together form a cavity 823 for receiving the head 22 of the shaft 18 of the tie-down winch.

The first mounting post 826 may serve as a stop to limit the movement of the pawl 804 as the pawl moves from the open configuration toward the closed configuration. The extension 822 may contact the first mounting post 826 when the pawl 804 is in the fully open position to inhibit the pawl 804 from pivoting beyond the first mounting post 826. The second mounting post 828 may include an arcuate recess 828A for receiving the biasing member 806. The second mounting post 828 may support the biasing member 806 proximate the end portion 818B of the pawl 804 such that the biasing member 806 engages the end portion 818B of the pawl 804 to bias the pawl 804 toward the closed configuration.

In use, ratchet attachment 800 may be attached to a tool by inserting the drive head of the tool into the drive socket 810 of the plate 802. The pawl 804 may be moved to the open configuration by moving the end portion 818A of the pawl 804 radially outward. For example, a user may grasp the end portion 818A and/or the extension 822 of the pawl 804 to move the end portion 818A outward. Moving the pawl 804 to the open configuration moves the protrusion 820 radially outward to permit the head 22 of the shaft 18 of the tie-down winch to be received in the recess 812 of the plate 802. The plate 802 may be positioned over the head 22 of the shaft 18 with the head 22 at least partially received into the recess 812 of the plate 802. The pawl 804 may be moved to the closed configuration to cause the protrusion 820 of the pawl 804 to be inserted into a hole 24 of the head 22 of the shaft 18. The pawl 804 may be moved to the closed configuration, for example, by releasing the end portion 818A of the pawl 804 such that the biasing member 806 drives the pawl 804 to the closed configuration. The ratchet attachment 800 may be rotated relative to the head 22 until the protrusion 820 is aligned with and inserted into a hole 24 of the head 22. The tool may then be used to rotate the ratchet attachment 800 via the drive socket 810 to cause the shaft 18 of the tie-down winch to be rotated, for example, to tighten the strap of the tie-down winch as described above.

To detach the ratchet attachment 800 from the shaft 18, the pawl 804 may be moved to the open configuration to withdraw the protrusion 820 of the pawl 804 from the hole 24 of the head 22 of the shaft 18. The pawl 804 may be moved to the open configuration as described above by moving the end portion 818A radially outward. The ratchet attachment 800 may then be slid axially relative to the shaft 18 to withdraw the head 22 of the shaft 18 from the recess 812 of the ratchet attachment 800 to detach the ratchet attachment 800 from the tie-down winch.

Uses of singular terms such as "a," "an," are intended to cover both the singular and the plural, unless otherwise indicated herein or clearly contradicted by context. The terms "comprising," "having," "including," and "containing" are to be construed as open-ended terms. It is intended that the phrase "at least one of" as used herein be interpreted in the disjunctive sense. For example, the phrase "at least one of A and B" is intended to encompass A, B, or both A and B.

While there have been illustrated and described particular embodiments of the present invention, those skilled in the art will recognize that a wide variety of modifications, alterations, and combinations can be made with respect to the above-described embodiments without departing from the scope of the invention, and that such modifications, alterations, and combinations are to be viewed as being within the ambit of the inventive concept.

What is claimed is:

1. A winch accessory comprising:
    a body including a recess sized to receive an end portion of a shaft that includes at least one radial hole, the body including a drive socket to receive a drive head of a tool to rotate the body; and
    a pawl mounted to the body and having a protrusion, the protrusion movable relative to the body between an open configuration where the end portion of the shaft is able to be inserted into and withdrawn from the recess of the body and a closed configuration where the protrusion secures the end portion of the shaft to the body when the end portion of the shaft is received in the recess,
    wherein the pawl includes an arm having a first end portion and a second end portion, the first end portion of the arm pivotally mounted to the body, the protrusion extending from the second end portion of the arm.

2. The winch accessory of claim 1 wherein the protrusion is biased toward the closed configuration.

3. The winch accessory of claim 1 wherein the pawl pivots about the first end portion of the arm to move the protrusion between the open and closed configurations, wherein a biasing member engages the first end portion of the pawl to bias the protrusion toward the closed configuration.

4. The winch accessory of claim 1 wherein in the closed configuration the protrusion covers at least a portion of an opening to the recess of the body and in the open configuration the protrusion is withdrawn from the opening to the recess of the body.

5. A winch accessory comprising:
    a body including a recess sized to receive an end portion of a shaft that includes at least one radial hole, the body including a drive socket to receive a drive head of a tool to rotate the body; and
    a pawl mounted to the body and having a protrusion, the protrusion movable relative to the body between an open configuration where the end portion of the shaft is able to be inserted into and withdrawn from the recess of the body and a closed configuration where the protrusion secures the end portion of the shaft to the body when the end portion of the shaft is received in the recess,
    further comprising a support bracket attached to the body, at least a portion of the pawl sandwiched between the support bracket and the body.

6. The winch accessory of claim 5 wherein the support bracket includes a post that limits the movement of the pawl as the pawl moves from the open configuration toward the closed configuration.

7. The winch accessory of claim 5 further comprising a biasing member, wherein the support bracket supports the biasing member to engage the pawl to bias the protrusion to the closed configuration.

8. The winch accessory of claim 1 wherein the protrusion is extended into the at least one radial hole of the shaft to secure the shaft to the body.

9. The winch accessory of claim 5 wherein the protrusion is biased toward the closed configuration.

10. The winch accessory of claim 5 wherein the pawl includes an arm having a first end portion and a second end portion, the first end portion of the arm pivotally mounted to the body, the protrusion extending from the second end portion of the arm.

11. The winch accessory of claim 10 wherein the pawl pivots about the first end portion of the arm to move the protrusion between the open and closed configurations, wherein a biasing member engages the first end portion of the pawl to bias the protrusion toward the closed configuration.

12. The winch accessory of claim 5 wherein in the closed configuration the protrusion covers at least a portion of an opening to the recess of the body and in the open configuration the protrusion is withdrawn from the opening to the recess of the body.

13. The winch accessory of claim 5 wherein the protrusion is extended into the at least one radial hole of the shaft to secure the shaft to the body.

14. The winch accessory of claim 1 further comprising a support bracket attached to the body, at least a portion of the pawl sandwiched between the support bracket and the body.

15. The winch accessory of claim 14 wherein the support bracket includes a post that limits the movement of the pawl as the pawl moves from the open configuration toward the closed configuration.

16. The winch accessory of claim 14 further comprising a biasing member, wherein the support bracket supports the biasing member to engage the pawl to bias the protrusion to the closed configuration.

* * * * *